US011483085B1

(12) United States Patent
Pogue et al.

(10) Patent No.: US 11,483,085 B1
(45) Date of Patent: Oct. 25, 2022

(54) DEVICE TIME SYNCHRONIZATION BY NETWORKING DEVICE

(71) Applicant: Amazon Technologies, Inc., Seattle, WA (US)

(72) Inventors: Michael Alan Pogue, Sunnyvale, CA (US); Maxim Spivak, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/572,411

(22) Filed: Sep. 16, 2019

(51) Int. Cl.
*H04J 3/06* (2006.01)
*H04L 47/28* (2022.01)

(52) U.S. Cl.
CPC .......... *H04J 3/0641* (2013.01); *H04J 3/0658* (2013.01); *H04L 47/28* (2013.01)

(58) Field of Classification Search
CPC ....... H04J 3/0641; H04J 3/0658; H04L 47/28; H04W 56/0015; H04N 21/2143; H04N 21/4307; H04N 21/43079; H04N 21/43072
See application file for complete search history.

(56) References Cited

U.S. PATENT DOCUMENTS

| | | | | |
|---|---|---|---|---|
| 7,653,344 B1* | 1/2010 | Feldman | ................ | H04H 20/61 |
| | | | | 455/3.06 |
| 9,846,564 B1* | 12/2017 | Toksoz | ..................... | H04R 3/12 |
| 9,979,998 B1* | 5/2018 | Pogue | .................. | H04J 3/0667 |
| 10,667,001 B2* | 5/2020 | Goldberg | ........... | H04N 21/8547 |
| 2009/0122782 A1* | 5/2009 | Horn | ..................... | H04J 3/0679 |
| | | | | 370/350 |
| 2010/0265936 A1* | 10/2010 | Yeh | ..................... | H04W 56/001 |
| | | | | 370/350 |
| 2010/0284389 A1* | 11/2010 | Ramsay | ................ | G06F 16/957 |
| | | | | 370/338 |
| 2014/0093085 A1* | 4/2014 | Jarvis | .................. | H04R 29/007 |
| | | | | 381/17 |
| 2014/0153440 A1* | 6/2014 | Zhou | ...................... | H04L 45/28 |
| | | | | 370/254 |
| 2014/0195675 A1* | 7/2014 | Silver | .................... | H04L 67/02 |
| | | | | 709/224 |
| 2014/0269757 A1* | 9/2014 | Park | .................. | H04N 21/4305 |
| | | | | 370/432 |

(Continued)

OTHER PUBLICATIONS

Jeon et al., "An efficient method of reselecting Grand Master in IEEE 802.1 AS," The 20th Asia-Pacific Conference on Communication (APCC2014), Pattaya, Thailand, 2014, pp. 303-308 (Year: 2014).*

*Primary Examiner* — Un C Cho
*Assistant Examiner* — Lalita W Pace
(74) *Attorney, Agent, or Firm* — Lee & Hayes, P.C.

(57) ABSTRACT

Systems and methods for device time synchronization by networking devices are disclosed. For example, a networking device may be configured to perform one or more operations to synchronize time as between the networking device and one or more computing devices in an environment. The networking device may be selected from multiple networking devices to be the time master based on one or more factors and/or operations, such as the number of devices in communication with the networking devices, the device types of those devices, device-communication amounts, communication abilities of the devices, and/or which networking device has a wired connection to a modem, for example.

20 Claims, 9 Drawing Sheets

(56) References Cited

U.S. PATENT DOCUMENTS

| | | | |
|---|---|---|---|
| 2015/0245306 A1* | 8/2015 | Boehlke | H04N 21/43637 370/350 |
| 2015/0334442 A1* | 11/2015 | Charania | H04N 21/4334 725/44 |
| 2016/0266868 A1* | 9/2016 | Allen | H04W 40/22 |
| 2016/0337472 A1* | 11/2016 | Gossain | H04L 67/10 |
| 2017/0055235 A1* | 2/2017 | Rabii | H04N 21/43637 |
| 2017/0055236 A1* | 2/2017 | Levesque | H04W 56/0015 |
| 2017/0208007 A1* | 7/2017 | Malhotra | H04L 47/15 |
| 2018/0184152 A1* | 6/2018 | Kirkpatrick | H04N 21/43635 |
| 2018/0233136 A1* | 8/2018 | Torok | G10L 15/22 |
| 2018/0234765 A1* | 8/2018 | Torok | H04R 3/12 |
| 2019/0171762 A1* | 6/2019 | Luke | H04L 65/762 |
| 2019/0364346 A1* | 11/2019 | Gupta | H04N 21/4307 |
| 2020/0213725 A1* | 7/2020 | Lang | G10L 15/22 |
| 2021/0006903 A1* | 1/2021 | Liu | H04N 21/43615 |

* cited by examiner

DEVICE TIME SYNCHRONIZATION BY NETWORKING DEVICE

BACKGROUND

Devices associated with a given environment may transmit information and/or data packets to each other. Time synchronization between devices may be advantageous as such information and/or data packets are sent and received. Described herein are improvements in technology and solutions to technical problems that can be used to, among other things, assist in time-synchronization between devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
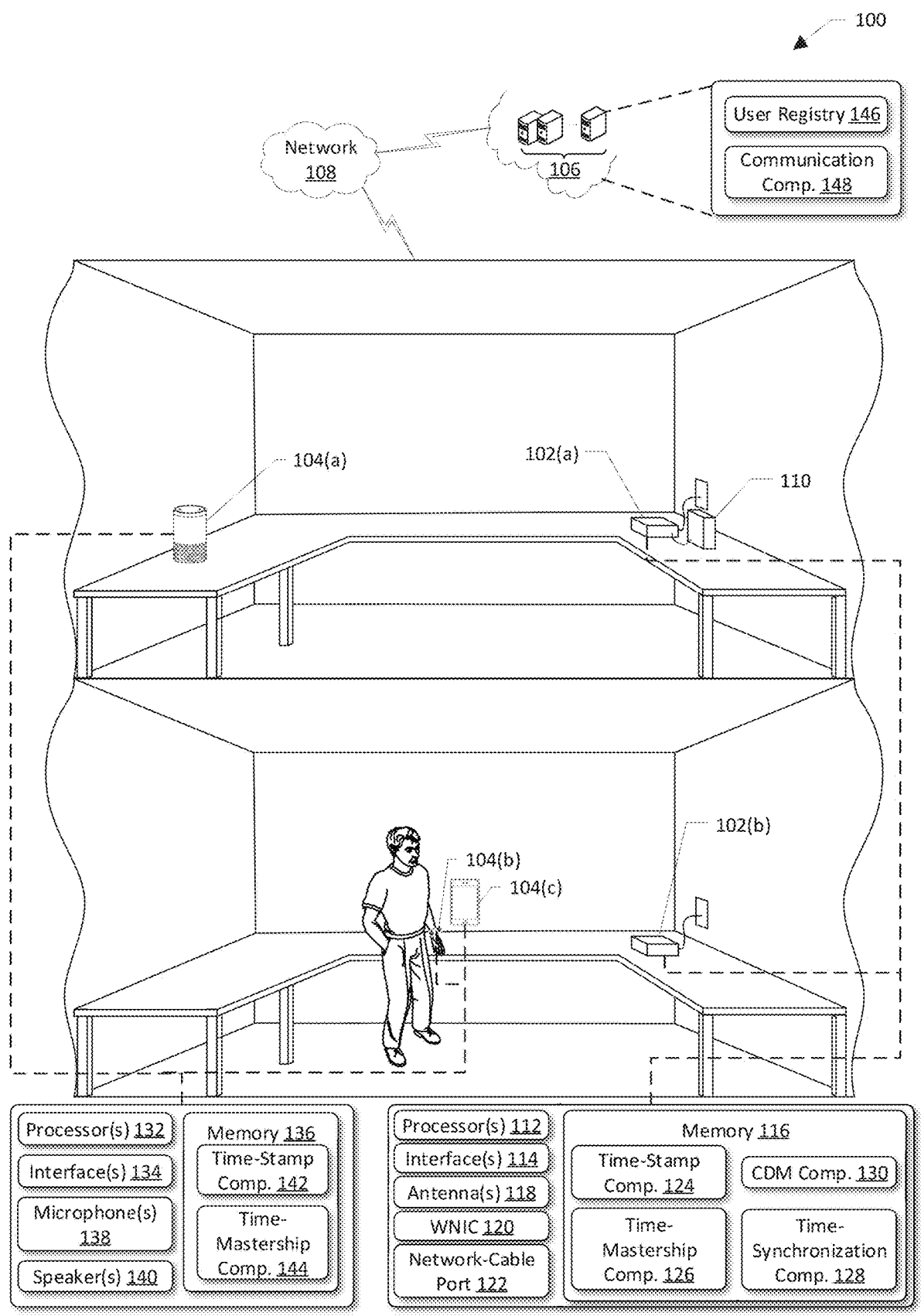
FIG. 1 illustrates a schematic diagram of an example environment for device time synchronization by networking devices.

Systems and methods for device time synchronization by networking devices are disclosed. Take, for example, an environment (such as a home, room, or other physical space) that may include numerous electronic devices. Those devices may communicate information via wired connections and/or wirelessly, such as by utilizing a router component. In examples, one or more wireless networking devices may be dispersed throughout the environment and/or within communicable range of at least a portion of the environment. It should be understood that when a "networking device" is described herein, the networking device may include a device that enables data to be communicated on a computer network and/or that enables interactions between devices on a computer network. Such networking devices may also mediate data transmission in a computer network. Examples of networking devices may include a wireless mesh-network node, a range extender, an access point, and/or a network router component. In general, the "networking device" includes functionality for communicating between computing devices and an external source, such as via the Internet and/or utilizing telecommunications protocols. For example, a given environment may have one networking device that is connected to a modem. One or more other networking devices may be positioned elsewhere (in and/or outside the environment) and may be configured to communicate with the networking device connected to the modem. By doing so, a network and/or "mesh" of networking devices may be established in the environment to provide wireless Internet access to one or more of the devices associated with the environment and/or within communicable range of at least a portion of the environment. For example, the networking device connected to the modem may be situated in a first room, such as an office, for example. That networking device may send information to and receive information from one or more devices in the office and/or spaces near the office. Another of the networking devices may be situated on a different floor of the environment, such as in a basement of the environment and/or a second story of the environment. This other networking device may send and receive information with one or more devices in the basement and/or second story. While the networking devices may each communicate with the same devices, some devices that are more proximate to a particular networking device may communicate that networking device, while other devices that are more proximate to another networking device may communicate with that other networking device.

In examples, the devices within the environment and/or within communicable range of at least a portion of the environment may be configured to output content in a time-synchronous manner and/or the devices may utilize clocks for time synchronization among devices. Generally, one of the devices is selected as a time master device while the other devices are selected as non-master devices. Selecting which device will act as the time master may be based at least in part on one or more factors, such as which device includes the most up-to-date and/or favorable hardware, such as antennas, which device has the most computing power available, the type of power source available to each device, whether the device is stationary or portable, (historical) networking conditions near each device (e.g., near a microwave may create periodic interference), etc. Once a time master is selected, data is sent between the time master and the non-master devices along with time stamps generated by each of the devices. The time stamps may be utilized by the time master to determine differences in time keeping as between the time master and given non-master devices. The time master may then determine a relationship between the time master and one of the non-master devices such that when data is sent to the non-master device, it is sent based at least in part on the relationship such that output of content by the non-master device and/or performance of other operations by the non-master device may be performed in a time-synchronous manner with output of content by one or more other devices and/or may be performed at a desired time. However, when determining relationships among the time master and non-master devices, data sent between devices may be sent utilizing the networking devices described herein. For example, when a non-master device sends data, including a time stamp, to the time master, the data is sent to the networking device, which then sends the data to the time master. This additional transmission of data between the time master and the non-master device utilizing the networking device may introduce latency, make synchronization among devices less favorable, and increase the amount of time for determining convergence of time keeping among devices. Additionally, performance of operations associated with time mastership utilizes computational resources of the device selected as the time master, which may decrease that device's ability to perform other operations and/or may delay performance of other operations.

Among other things, the present innovation provides for device time synchronization by a networking device. For example, instead of a non-networking device within the environment acting as the time master, one of the networking devices may be selected as the time master and may perform operations associated with time mastership. For example, the device within an environment selected to be the time master may be a networking device or otherwise may be a device that includes an antenna configured to wirelessly communicate with one or more computing devices, a wireless network interface controller, a first clock, a router component and/or switch component, one or more radio components, processors, and computer-readable media storing computer-executable instructions that cause the processors to perform operations associated with time mastership. For example, the operations may include receiving data including a time stamp indicating when a given computing device sent the data according to another clock of that computing device. Given that the time master is a networking device, the data may be received wirelessly and directly from the computing device, as opposed to being received from an intermediary device, such as a networking device. The operations may also include determining, utilizing the time stamp, an association between time keeping performed by the first clock and time keeping performed by the second clock. The association may indicate differences in time keeping and/or parameters associated with time keeping as between the networking device and the computing device. The operations may also include synchronizing time with the computing device utilizing the association.

In examples, a given environment may include more than one networking device. In these examples, selection of one of the networking devices to serve as the time master may be performed. To determining which of the networking devices will be selected as the time master, one or more operations may be performed and/or one or more factors may be utilized. For example, a given networking device may determine data indicating a first device type of a given computing device in communication with the networking device. The device type may indicate abilities, hardware, and/or functionalities that the computing device is configured to perform. For example, a given computing device may be configured to output audio, and/or output images, and/or to provide surround-sound functionality. Determining the device type may include receiving data from the computing device indicating its device type and/or its hardware and/or abilities, and/or determining the device type may be based at least in part on information received from a remote system and/or information received via a user device, such as a mobile device utilized when setting up and/or interacting with the computing device. Additionally, the networking device may receive, from a remote system, data indicating that a second networking device is in wireless communication with a second computing device associated with another device type. The other device type may indicate an absence of audio-output ability by the second computing device. In these examples, the networking device associated with the first computing device having the first device type may be selected instead of the networking device associated with the second computing device based at least in part on the second computing device being of the second device type. In these examples, the networking device associated with computing devices that output audio, which may be devices where time synchronization is more important than at least some other types of devices, may be selected over other networking devices associated with computing devices that do not output audio.

Additionally, or alternatively, selection of a networking device as the time master may include determining data indicating a first number of computing devices in direct communication with a given networking device. This data may be received from the computing devices, generated by the networking device, and/or may be received from a remote system. Additional data may be received, such as from the remote system, indicating a second number of computing devices that communicate directly with another networking device without any intervening devices receiving and/or relaying information between the computing devices and the networking device. It should be understood that when two devices are described herein as being in direct communication and/or communicating directly with each other, such disclosure includes instances where data is sent to and from the devices without an intermediary device, such as an access point, router, range extender, or other relay device receiving and/or sending the data. In examples, the first number of computing devices may be greater than the second number of computing devices, indicating that the first networking device communicates with more computing devices than the second networking device. In these examples, the networking device associated with the most computing devices may be selected as the time master.

Additionally, or alternatively, selection of device as the time master may include determining data indicating a first frequency a networking of communication (e.g., a first number of times devices communicated within a period of time) between a first networking device and a computing device in direct communication with the first networking device without any intervening devices receiving and/or relaying information between the computing devices and the networking device. Determining this data may include receiving the data from the computing device, generating the data by the first networking device, and/or receiving the data from a remote system. Additionally, data indicating a second number of times a second networking device and a second computing device communicate with each other within a given period of time may be received. In examples, the first number of communications may be more than the second number of communications. In other examples, the first number of communications may satisfy a threshold number of communications while the second number of communications may not satisfy the threshold number of communications. In these examples, the networking device associated with the computing device that communicates with the networking device most frequently may be selected as the time master.

Additionally, or alternatively, selection of a networking device as the time master may include receiving data indicating first wireless communication abilities of a first computing device associated with a first networking device. Additionally, data indicating second wireless communication abilities of a second computing device associated with a second networking device may be received. In examples, the first wireless communication abilities of the first computing device may be less favorable than the second wireless communication abilities of the second computing device. For example, the communication hardware associated with the first computing device may utilize outdated communication protocols, may not include components that the communication hardware of the second computing device contains, the communication hardware may be configured to operate utilizing limited communication protocols, etc. In these examples, the networking device associated with the less favorable wireless communication abilities may be selected as the time master. By so doing, the networking device associated with devices with less favorable wireless communication abilities may be selected to ease time synchronization with such computing devices.

Additionally, or alternatively, selection of a networking device as the time master may include determining that a wired connection between a first networking device and a modem is established. For example, a network cable may be determined to be received in a network-cable port of the first networking device and the networking device may be receiving data from the modem via the network cable. A network cable may include, for example, an Ethernet cable, a fiberoptic cable, a serial cable, a coaxial cable, etc. Additionally, data indicating an absence of a wired connection between a second networking device and the modem may be received, such as from the second networking device and/or from a remote system. In these examples, the first networking device may be selected as the time master based at least in part on the first networking device having a wired connection with the modem while the other networking device does not have a wired connection with the modem.

Additionally, or alternatively, a determination may be made that a new computing device has been added to a network associated with a networking device. For example, an internet-of-things device, also described herein as an accessory device, may be added to an environment. The accessory device may include, for example, a smart light bulb, smart plug, appliance, voice-enabled device, set-top box, speaker, thermostat, doorbell, lock, television, watch, etc. Based at least in part on the new device communicating with one or more networking devices, and/or based at least in part on data from the new device and/or from a remote system indicating that such a device has been added to the network, selection of a networking device as the time master may be determined. For example, a first networking device may receive data indicating that a number of computing devices in direct communication with a second networking device without any intervening devices receiving and/or relaying information between the computing devices and the networking device has increased from a first number of computing devices to a second number of computing devices. The networking device may determine that the second number of computing devices is greater than a third number of computing devices in direct communication with the first networking device without any intervening devices receiving and/or relaying information between the computing devices and the networking device. In these examples, it may be determined that the second networking device is more favorable to act as the time master and the second networking device may be selected as the time master for subsequent time synchronization. This dynamic determination of which networking device should act as the time master may be based on the number of computing devices in communication with networking devices and/or the determination may be based at least in part on an indication that the networking device with a wired connection to a modem has changed, and/or the device type of the new device, and/or a change in the number of communications between networking devices and devices in a given period of time, for example.

Additionally, or alternatively, selection of a networking device as a content-distribution master may be performed. For example, the networking device selected as the time master may be selected as a content-distribution master, which may be based at least in part on the networking device being selected as the time master. In these examples, the networking device may synchronize time with one or more computing devices and may send instances of audio-data packets to the one or more computing devices in a time-synchronous manner utilizing the determined associations between time kept by the non-master devices and the networking device.

Additionally, or alternatively, multiple networking devices may be selected as time master devices and some or all of the multiple networking devices may perform operations as a time master. In these examples, one of the multiple networking devices may be selected as a primary time master and the other networking devices may be selected as secondary time masters. In these examples, computing devices that communicate with a given networking device may associate that networking device as the time master for those computing devices. Other computing devices that communication with another networking device may associate that other networking device as the time master for those other computing devices.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for device time synchronization by networking devices. The system 100 may include, for example, one or more wireless networking devices 102(*a*), 102(*b*), which may also be described herein as networking devices and/or time masters and/or primary devices. The system 100 may also include one or more other computing devices 104(*a*)-(*c*), which may be described herein as non-master devices and/or secondary devices. It should be understood that the dotted lines depicted in FIG. 1 are meant to show which devices include the components shown at the bottom of FIG. 1, and the dotted lines are not meant to show communication pathways between devices.

One or more of the computing devices 104(*a*)-(*c*) may be configured to receive user utterances and perform operations in response to such user utterances. In these examples, some of the devices may be "hands free" such that interactions with the devices are performed through audible requests and responses. In other examples, some of the devices may include a display and/or may receive touch input and/or audible input. The networking devices 102(*a*), 102(*b*) and/or the computing devices 104(*a*)-(*c*) may be configured to send data to and/or receive data from each other and/or from a remote system 106, such as via a network 108. In examples, the networking devices 102(*a*), 102(*b*) and/or the computing devices 104(*a*)-(*c*) may communicate directly with the system 106, via the network 108. Additionally, it should be understood that a given space and/or environment may include numerous devices and need not include the same number and/or type of devices illustrated in FIG. 1. It should also be understood that when a "space" or "environment" is used herein, those terms mean an area and not necessarily a given room, building, or other structure, unless otherwise specifically described as such. In examples, an environment may include an area associated with a network established utilizing at least one of the networking devices 102(a), 102(b). The system 100 may also include a modem 110, which may be configured to provide a wired connection to the Internet and to connect, via a network cable, to at least one of the networking devices 102(a), 102(b).

The networking devices 102(a), 102(b) may include one or more components, such as, for example, one or more processors 112, one or more network interfaces 114, memory 116, one or more antennas 118, a wireless network interface controller (WNIC) 120, and/or a network-cable port 122. The memory may include components such as a time-stamp component 124, a time-mastership component 126, a time-synchronization component 128, and/or a content-distribution master (CDM) component 130. The antennas 118 may include one or more 2.4 GHz antennas and/or one or more 5 GHz antennas. It should be understood that while examples of antennas are provided herein, the antennas 118 may include any components configured to wirelessly send and/or receive data. For example, the antennas 118 may also include a Bluetooth antenna. The WNIC 120 may include a network interface controller that connects to a wireless radio-based computer network. The WNIC may operate utilizing the IEEE 802.11 protocol, but may also be configured to operate utilizing one or more other protocols, such as a Bluetooth protocol. The network-cable port 122 may be configured to receive a portion of a network cable, such as an Ethernet cable. The network-cable port 122 may be configured to receive data, via the network cable, from the modem 110. The components of the memory 116 will be described in detail below.

The computing devices 104(a)-(c) may include one or more components, such as, for example, one or more processors 132, one or more network interfaces 134, memory 136, one or more microphones 138, and/or one or more speakers 140. The microphones 138 may be configured to capture audio, such as user utterances, and generate corresponding audio data. The speakers 140 may be configured to output audio, such as audio corresponding to audio data received from another device and/or the system 106. It should be understood that while several examples used herein include a computing devices 104(a)-(c) that allows users to interact therewith via user utterances, one or more other devices, which may not include a voice interface, may be utilized instead of or in addition to computing devices 104(a)-(c). In these examples, the device may be configured to send and receive data over the network 108 and to communicate with other devices in the system 100. The memory 136 may include one or more components such as, for example, a time-stamp component 142 and/or a time-mastership component 144, which will be described in more detail below.

The remote system 106 may include components such as, for example, a user registry 146 and/or a communication component 148. Additional components of the remote system may include, for example, a speech-processing system, an audio-video (A/V) speechlet, and/or an A/V retrieval component. It should be understood that while the speech-processing system and the other components may be described and/or be depicted as separate from each other, some or all of the components may be a part of the same system. The speech-processing system may include an automatic speech recognition component (ASR) and/or a natural language understanding component (NLU). Each of the components described herein with respect to the remote system 106 may be associated with their own systems, which collectively may be referred to herein as the remote system 106, and/or some or all of the components may be associated with a single system. Additionally, the remote system 106 may include one or more applications, which may be described as skills. "Skills," as described herein may be applications and/or may be a subset of an application. For example, a skill may receive data representing an intent. For example, an intent may be determined by the NLU component and/or as determined from user input via a computing device. Skills may be configured to utilize the intent to output data for input to a TTS component, a link or other resource locator for audio data, and/or a command to a device, such as the computing devices 104(a)-(c).

Skills may extend the functionality of some or all devices associated with the system 100 that can be controlled by users utilizing a voice-user interface. In some examples, skills may be a type of application that may be useable in association with accessory devices and may have been developed specifically to work in connection with given accessory devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the computing devices 104(a)-(c). The application(s) may also be utilized, in examples, to receive input, such as from a user of a personal device and/or the computing devices 104(a)-(c), and send data and/or instructions associated with the input to one or more other devices.

In examples, some or each of the components of the remote system 106 may include their own processor(s), network interface(s), and/or memory. As such, by way of example, the speech-processing system may include and/or be associated with processor(s), network interface(s), and/or memory. The A/V speechlet and/or the A/V retrieval component may include and/or be associated with different processor(s), network interface(s), and/or memory, or one or more of these components may utilize some or all of the same processor(s), network interface(s), and/or memory utilized by the speech-processing system. These components are described in detail below. Additionally, the operations and/or functionalities associated with and/or described with respect to the components of the remote system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 146 may be configured to identify, determine, and/or generate associations between users, user accounts, and/or devices. For example, one or more associations between user accounts may be identified, determined, and/or generated by the user registry 146. The user registry 146 may additionally store information indicating one or more applications and/or resources accessible to and/or enabled for a given user account. Additionally, the user registry 146 may include information indicating device identifiers, such as naming identifiers, associated with a given user account, as well as device types associated with the device identifiers. The user registry 146 may also include information indicating user account identifiers, naming indicators of devices associated with user accounts, and/or associations between devices, such as the networking devices 102(a), 102(b) and/or the computing devices 104(a)-(c). The user registry 146 may also include information associated with usage of the networking devices and computing devices. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data. In examples, the user registry 146 may store data indicating which devices associated with a given user account are designated as being able to receive commands to perform operations, such as commands from the remote system 106 in response to user utterances. For purposes of this disclosure, when a networking device 102(a), 102(b) is selected as a time master, the user registry 146 may have information indicating that such a networking device 102(a), 102(b) is also capable of outputting audio. However, since the networking device 102(a), 102(b) does not include audio-output functionality, the user registry 146 may store an indication that the networking device is not an available device for sending commands to, such as commands to output audio.

The communication component 148 may be configured to send data to and receive data from the networking devices 102(a), 102(b), for example. In examples, one or more determinations may be made by the networking devices 102(a), 102(b), such as determinations on which networking device 102(a), 102(b) is to act as a time master and which will act as a non-master device. Additional information such as the number of computing devices 104(a)-(c) in communication with a given networking device 102(a), 102(b), types of devices in communication with a given networking device 102(a), 102(b), a number of communications between networking devices 102(a), 102(b) and computing devices 104(a)-(c) within a given period of time, and/or indications of new devices wirelessly connected to networking devices 102(a), 102(b), may be sent to the remote system 106 via the communications component 148. The communications component 148 may also send the number of computing devices 104(a)-(c) in communication with a given networking device 102(a), 102(b), types of devices in communication with a given networking device 102(a), 102(b), a number of communications between networking devices 102(a), 102(b) and computing devices 104(a)-(c) within a given period of time, and/or indications of new devices wirelessly connected to networking devices 102(a), 102(b) to one or more of the networking devices 104(a)-(b). In examples where scores, such as time-mastership scores, are determined, those scores may be sent and/or received utilizing the communication component 148.

The speech-processing system may be configured to receive audio data from the devices and to perform speech-processing operations. For example, the ASR component may be configured to generate text data corresponding to the audio data, and the NLU component may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. Speechlets, as described herein may otherwise be described as applications and may include functionality for utilizing intent data to generate directives and/or instructions. For example, a communications speechlet may be called when the intent indicates that an action is to be performed associated with establishing a communication channel with another device. The speechlet may be designated as being configured to handle the intent of establishing a communication channel, for example. The speechlet may receive the intent data and/or other data associated with the user utterance from the NLU component, such as by an orchestrator of the remote system 106, and may perform operations to instruct devices to perform an operation. For example, the A/V speechlet may cause other components of the system 106 to retrieve requested content and send that content to one or more of the devices. The remote system 106 may generate audio data confirming that the request was received and/or that the content will be output, such as by a text-to-speech component.

Turning now to the components of the memory 116 and/or the memory 136, the components may be utilized for device time synchronization. For given applications, the devices within the environment may be configured to output content in a time-synchronous manner and/or the devices may utilize clocks for time synchronization between devices. Generally, one of the devices is selected as a time master device while the other devices are selected as non-master devices. Selecting which device will act as the time master may be based at least in part on one or more factors, such as which device includes the most up-to-date and/or favorable hardware, such as antennas, which device has the most computing power, the power source of a given device, whether the device is stationary or portable, etc. In these examples, each of the devices may generate a time-mastership score. The device with the most favorable time-mastership score may be selected as the time master. Once a time master is selected, data may be sent between the time master and the non-master devices along with time stamps generated by each of the devices. The time stamps may be utilized by the time master to determine differences in time keeping as between the time master and given non-master devices. The time master may then determine a relationship between the time master and a given non-master device such that when data is sent to the non-master device, it is sent based at least in part on the relationship such that output of content by the non-master device and/or performance of other operations by the non-master device may be performed in a time-synchronous manner with output of content by one or more other devices and/or may be performed at a desired time. However, when determining relationships between the time master and non-master devices, data sent between such devices is sent utilizing the networking devices 102(a), 102(b) described herein. For example, when a non-master device, such as the computing devices 104(a)-(c) sends data, including a time stamp, to the time master, the data is sent to the networking device 102(a), 102(b), which then sends the data to the time master. This additional transmission of the data between the time master and the non-master device may introduce latency, make synchronization between devices less favorable, and increase the amount of time for determining convergence of time keeping as between devices. Additionally, performance of operations associated with time mastership utilizes computational resources of the device selected as the time master, which may decrease that device's ability to perform other operations and/or may delay performance of other operations.

Instead of a non-networking device within the environment acting as the time master, one of the networking devices 102(a), 102(b) may be selected as the time master and may perform operations associated with time mastership. In these examples, the time-stamp component 142 of the computing devices 104(a)-(c) may generate a time stamp indicating when, as determined by a clock of the computing device in question, data is sent to the networking device 102(a) selected as the time master. The data, including the time stamp, may be received by the networking device 102(a), which may generate its own time stamp, such as utilizing the time-stamp component 124, indicating when the networking device 102(a) received the data from the computing device 104(a)-(c). The networking device 102(a) may send data to the computing device 104(a)-(c) with an additional time stamp indicating when the data is sent to the computing device 104(a)-(c) according to a clock of the networking device 102(a). This process may be repeated multiple times such that the networking device 102(a) receives and generates multiple time stamps for when data is received and sent as between the networking device 102(a) and the computing device in question.

The time-mastership component 126 may be configured to control the sending of data, including time stamps, between the networking device 102(a) and the computing devices 104(a)-(c). The time-mastership component 126 may cause the time-stamp component 124 to generate one or more time stamps, and/or the time-mastership component 126 may send a command to the computing devices 104(a)-(c) instructing the computing devices 104(a)-(c) to generate time stamps and send data, including those time stamps, to the networking device 102(a). It should be understood that while the examples provided herein discuss the networking devices 102(a), 102(b) as having a time-mastership component 126, the computing devices 104(a)-(c) may also have a time-mastership component 144, which may be utilized in examples where a networking device 102(a), 102(b) is not selected as a time master and/or when an error occurs associated with the networking device 102(a), 102(b) such that time mastership is transferred to a computing device 104(a)-(c).

The time-synchronization component 128 may be configured to determine differences in time keeping as performed by the networking device 102(a) selected as the time master and time keeping performed by other devices in the system 100, such as the computing devices 104(a)-(c) and/or other networking devices 102(b). Differences in time keeping performed between various devices may be determined by the time-synchronization component 128. The time-synchronization component 128 may determine, utilizing the time stamps, an association between time keeping performed by a first clock of the networking device 102(a) and time keeping performed by a second clock of a computing device 104(a). The association may indicate differences in time keeping and/or parameters associated with time keeping as between the networking device 102(a) and the computing device 104(a). The operations may also include synchronizing time with the networking device 102(a) utilizing the association. Time synchronization may include determining one or more delays, and/or delay durations, to be included in a process flow associated with data sent from the networking device 102(a) to the computing devices 104(a)-(c) such that when the data is received and processed by the computing devices 104(a)-(c), output of content occurs at the computing devices 104(a)-(c) in a time-synchronized manner with the output of content by one or more other computing devices 104(a)-(c).

In examples, a given environment may include more than one networking device 102(a), 102(b). In these examples, selection of one of the networking devices 102(a), 102(b) to serve as the time master may be performed, such as by the time-mastership component 126. To determine which of the networking devices 102(a), 102(b) will be selected as the time master, one or more operations may be performed and/or one or more factors may be utilized. For example, a given networking device 102(a), 102(b) may determine data indicating a first device type of a given computing device 104(a)-(c) in communication with the networking device 102(a), 102(b). The device type may indicate abilities, hardware, and/or functionalities that the computing device 104(a)-(c) is configured to perform. For example, a given computing device 104(a)-(c) may be configured to output audio, and/or output images, and/or to perform surround sound functionality. Determining the device type may include receiving data from the computing device 104(a)-(c) indicating its device type and/or its hardware and/or abilities and/or determining the device type may be based at least in part on information received from the remote system 106 and/or information received via a user device, such as a mobile device utilized when setting up and/or interacting with the computing device 104(a)-(c). Additionally, the networking device 102(a) may receive, from the remote system 106, data indicating that a second networking device 102(b) is in direct communication with a second computing device 104(b) without any intervening devices receiving and/or relaying information between the computing devices and the networking device 102(b) associated with another device type. The other device type may indicate an absence of audio-output ability by the second computing device 104(b). In these examples, the networking device 102(a) associated with the first computing device 104(a) having the first device type may be selected instead of the networking device 102(b) associated with the second computing device 104(b) based at least in part on the second computing device 104(b) being of the second device type. In these examples, the networking device 102(a) associated with computing devices that output audio, which may be devices where time synchronization is more important than at least some other types of devices, may be selected over other networking devices 102(b) associated with computing devices that do not output audio.

Additionally, or alternatively, selection of a networking device 102(a), 102(b) as the time master may include determining data indicating a first number of computing devices 104(a)-(c) in direct communication with a given networking device 102(a), 102(b) without any intervening devices receiving and/or relaying information between the computing devices and the networking device. This data may be received from the computing devices 104(a)-(c), generated by the networking device 102(a), 102(b), and/or may be received from the remote system 106. Additional data may be received, such as from the remote system 106, indicating a second number of computing devices 104(a)-(c)

in direct communication with another networking device 102(a), 102(b) without any intervening devices receiving and/or relaying information between the computing devices and the networking device. In examples, the first number of computing devices 104(b), 104(c) may be greater than the second number of computing devices 104(a), indicating that the first networking device 102(b) communicates with more computing devices 104(b), 104(c) than the second networking device 102(a). In these examples, the networking device 102(b) associated with the most computing devices may be selected as the time master.

Additionally, or alternatively, selection of a networking device 102(a), 102(b) as the time master may include determining data indicating a first number of communications in a given period of time between a first networking device 102(a) and a computing device 104(a) in direct communication with the first networking device 102(a) without any intervening devices receiving and/or relaying information between the computing devices and the networking device. Determining this data may include receiving the data from the computing device 104(a), generating the data by the first networking device 102(a), and/or receiving the data from the remote system 106. Additionally, data indicating a second number of communications between a second networking device 102(b) and a second computing device 104(b) within a given period of time may be received. In examples, the first number of communications may be more than the second number of communications. In other examples, the first number of communications may satisfy a threshold number of communications while the second number of communications may not satisfy the threshold number of communications. In these examples, the networking device 102(a) associated with the computing device 104(a) that communicates with the networking device 102(a) most frequently may be selected as the time master.

Additionally, or alternatively, selection of a networking device 102(a), 102(b) as the time master may include receiving data indicating first wireless communication abilities of a first computing device 104(a) associated with a first networking device 102(a). Additionally, data indicating second wireless communication abilities of a second computing device 104(b) associated with a second networking device 102(b) may be received. In examples, the first wireless communication abilities of the first computing device 104(a) may be less favorable than the second wireless communication abilities of the second computing device 104(b). For example, the communication hardware associated with the first computing device 104(a) may utilize outdated communication protocols, may not include components that the communication hardware of the second computing device 104(b) contains, the communication hardware may be configured to operate utilizing limited communication protocols, etc. In these examples, the networking device 102(a) associated with the less favorable wireless communication abilities may be selected as the time master. By so doing, the networking device 102(a) associated with devices with less favorable wireless communication abilities may be selected to ease time synchronization with such computing devices.

Additionally, or alternatively, selection of a networking device 102(a), 102(b) as the time master may include determining that a wired connection between a first networking device 102(a) and the modem 110 is established. For example, at least a portion of a network cable may be determined to be received in the network-cable port 122 of the first networking device 102(a) and the networking device 102(a) may be receiving data from the modem 110 via the network cable. A network cable may include, for example, an Ethernet cable, a fiberoptic cable, a serial cable, a coaxial cable, etc. Additionally, data indicating an absence of a wired connection between a second networking device 102(b) and the modem 110 may be received, such as from the second networking device 102(b) and/or from the remote system 106. In these examples, the first networking device 102(a) may be selected as the time master based at least in part on the first networking device 102(a) having a wired connection with the modem 110 while the other networking device 102(b) does not have a wired connection with the modem 110.

Additionally, or alternatively, a determination may be made that a new computing device has been added to a network associated with the networking devices 102(a), 102(b). For example, an internet-of-things device, also described herein as an accessory device, may be added to an environment, such as a smart light bulb, smart plug, appliance, voice-enabled device, set-top box, speaker, thermostat, doorbell, lock, television, watch, etc. Based at least in part on the new device communicating with one or more networking devices 102(a), 102(b), and/or based at least in part on data from the new device and/or from the remote system 106 indicating that such a device has been added to the network, selection of a networking device 102(a), 102(b) as the time master may be determined. For example, a first networking device 102(a) may receive data indicating that a number of computing devices 104(b)-(c) in direct communication with a second networking device 104(b)-(c) without any intervening devices receiving and/or relaying information between the computing devices and the networking device has increased from a first number of computing devices to a second number of computing devices. The networking device 102(a) may determine that the second number of computing devices is greater than a third number of computing devices 104(a) in direct communication with the first networking device 102(a) without any intervening devices receiving and/or relaying information between the computing devices and the networking device. In these examples, it may be determined that the second networking device 102(b) is more favorable to act as the time master and the second networking device 102(b) may be selected as the time master for subsequent time synchronization. This dynamic determination of which networking device 102(a), 102(b) should act as the time master may be based on the number of computing devices in communication with networking devices and/or the determination may be based at least in part on an indication that the networking device with a wired connection to a modem has changed, and/or the device type of a new device, and/or a change in the number of communications between networking devices and devices within a given period of time, for example.

Additionally, or alternatively, selection of a networking device 102(a), 102(b) as a content-distribution master may be performed. For example, the networking device 102(a), 102(b) selected as the time master may be selected as a content-distribution master, which may be based at least in part on the networking device 102(a), 102(b) being selected as the time master. In these examples, a content-distribution master component 130 may send instances of audio-data packets to the one or more computing devices 104(a)-(c) in a time-synchronous manner utilizing the determined associations between time kept by the non-master devices and the networking device 102(a), 102(b).

For example, the networking device 102(a) may act as a content-distribution master and may second a first instance of audio data to a first computing device 104(a) configured to output audio corresponding to the audio data. For example, the user may request and/or the networking device 102(a) may determine that the first computing device 104(a) with audio-output capabilities is to output audio corresponding to the audio data.

The networking device 102(a) may also send, to a second computing device 104(b) configured to output the audio, a second instance of the audio data in a time-synchronous manner with sending the first instance of the audio data to the first computing device 104(a). For example, two computing devices may be requested to output the audio. By way of example, the two computing devices may be components of a surround sound system where the audio and/or different portions of the audio may be output by given speakers in the surround sound system. By way of additional example, the two computing devices may be disposed in different rooms of an environment but may output the audio in a whole-hole audio system. Output of the audio at or near the same time such that the same audio is output by the multiple speakers may be advantageous for a listening experience of the user. As such, time synchronization as described herein between the networking device 102(a) and the other computing devices may be performed such that the audio data is sent and/or processed at given times for corresponding audio to be output in a time-synchronous manner.

Additionally, in examples, the networking device 102(a) may send, utilizing a router component and while sending the first instance of the audio data and sending the second instance of the audio data, network data representing content other than the audio data to a third computing device 104(c). For example, given that the device acting as the time master is also a networking device, the networking device 102(a) may be configured to perform the operations associated with being a time master in parallel with performing other operations associated with a networking device 102(a), such as the sending and receiving of network data from a modem and/or from other computing devices. For example, the networking device 102(a) may perform time-mastership operations in parallel with sending content to a mobile phone and receiving input data for web browsing on a laptop device.

It should be noted that while text data is described as a type of data utilized to communicate between various components of the remote system 106 and/or other systems and/or devices, the components of the remote system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 112, 132, and/or the processor(s) described with respect to the components of the remote system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 112, 132, and/or the processor(s) described with respect to the components of the remote system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 112, 132, and/or the processor(s) described with respect to the components of the remote system 106 may possess its own local memory, which also may store program components, program data, and/or one or more operating systems.

The memory 116, 136, and/or the memory described with respect to the components of the remote system 106 may include volatile and nonvolatile memory, removable and non-removable media implemented in any method or technology for storage of information, such as computer-readable instructions, data structures, program component, or other data. Such memory 116, 136, and/or the memory described with respect to the components of the remote system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 116, 136, and/or the memory described with respect to the components of the remote system 106 may be implemented as computer-readable storage media ("CRSM"), which may be any available physical media accessible by the processor(s) 112, 132, and/or the processor(s) described with respect to the remote system 106 to execute instructions stored on the memory 116, 136, and/or the memory described with respect to the components of the remote system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 116, 136, and/or the memory described with respect to the components of the remote system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 114, 134, and/or the network interface(s) described with respect to the components of the remote system 106 may enable messages between the components and/or devices shown in system 100 and/or with one or more other polling systems, as well as other networked devices. Such network interface(s) 114, 134, and/or the network interface(s) described with respect to the components of the remote system 106 may include one or more network interface controllers (NICs) or other types of transceiver devices to send and receive messages over the network 108.

For instance, each of the network interface(s) 114, 134, and/or the network interface(s) described with respect to the components of the remote system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 114, 134, and/or the network interface(s) described with respect to the components of the remote system 106 may include a wide area network (WAN) component to enable message over a wide area network.

While various components of the remote system 106 have been labeled and named in this disclosure and each component has been described as being configured to cause the processor(s) to perform certain operations, it should be understood that the described operations may be performed by some or all of the components and/or other components not specifically illustrated.

Figure 2:
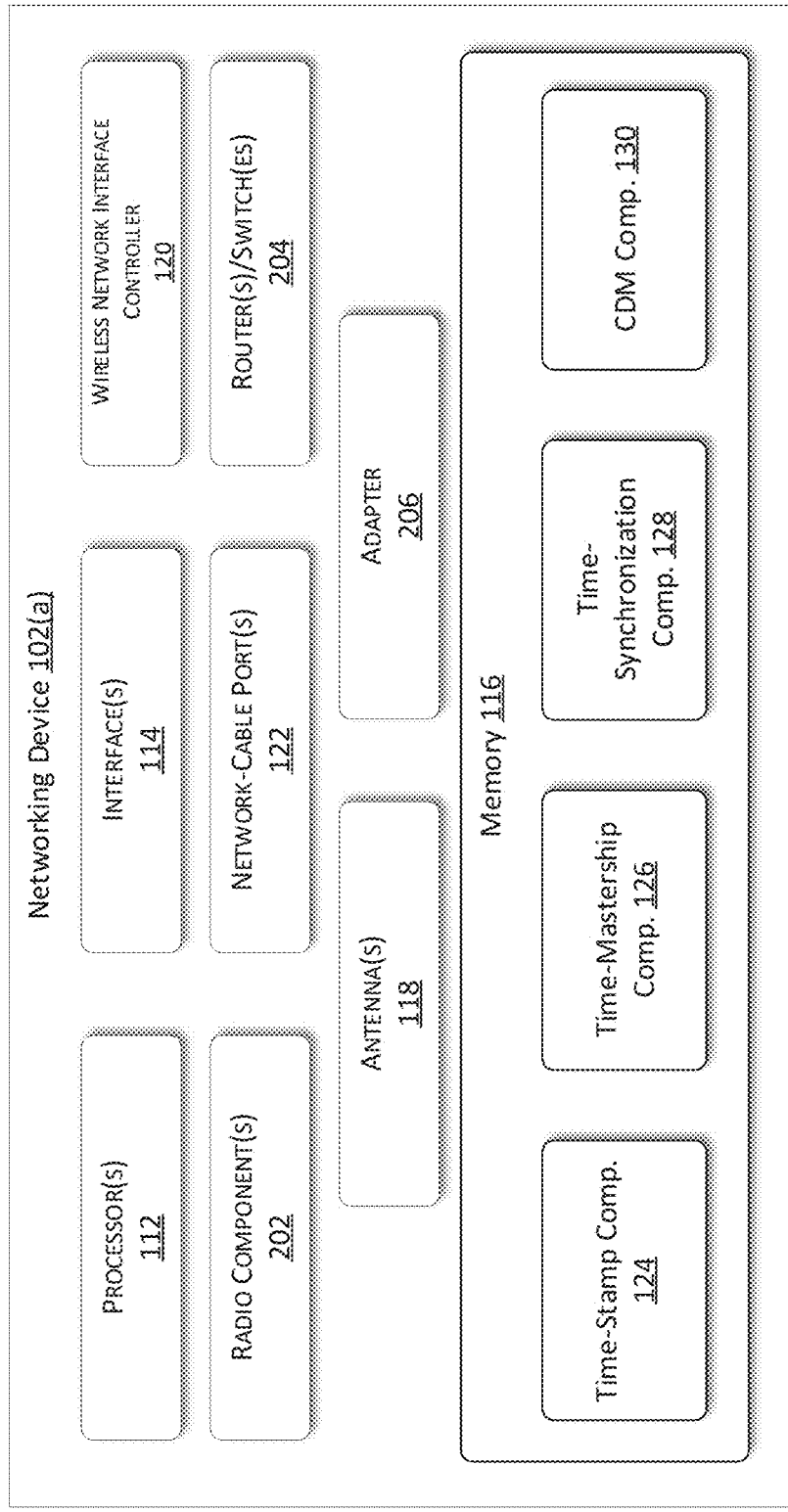
FIG. 2 illustrates a conceptual diagram of example components of a networking device used for device time synchronization.

FIG. 2 illustrates a conceptual diagram of example components of a wireless networking device 102(a) used for device time synchronization. The wireless networking device 102(a) may include some or all of the components described with respect to FIG. 1. For example, the wireless networking device 102(a) may include one or more processors 112, one or more network interfaces 114, memory 116, one or more antennas 118, a wireless network interface controller 120, and/or one or more network-cable ports 122. The memory 116 may include the same or similar components as described with respect to FIG. 1, such as the time-stamp component 124, the time-mastership component 126, the time-synchronization component 128, and/or the content-distribution master component 130. These components may perform the same or similar functions as the corresponding components as described with respect to FIG. 1. The wireless networking device 102(a) may also include one or more radio components 202, one or more router components and/or switch components 204, and/or an adapter 206. These components will be described in detail below. It should be understood that while the components of FIG. 2 are listed as separate components, some or all of these components may be the same component and/or perform one or more of the same operations. For example, the networking device 200 may include a router component, a switch component, or only a router component or a switch component.

For example, the antennas 118 may be configured for sending and/or receiving data at a given frequency, such as at 2.4 GHz. One or more other antennas 118 may be configured for sending and/or receiving data at a different frequency, such as 5 GHz. The number of antennas 118 associated with the various frequencies may be the same or different. For example, the antennas 118 may include two 2.4 GHz antennas and four 5 GHz antennas. The antennas 118 may also include one or more Bluetooth antennas configured for communicating utilizing one or more Bluetooth protocols. Each of the antennas 118 may be associated with a radio component 202. For example, the two 2.4 GHz antennas and two of the 5 GHz antennas operating as high-band antennas may be associated with a high-band radio component 202. The other two 5 GHz antennas operating as low-band antennas may be associated with a low-band radio component 202. Additionally, the Bluetooth antenna may be associated with a Bluetooth radio component 202. One or more filters may also be included and a filter may be associated with low-band communications while another filer may be associated with high-band communications.

The router component 204 may be configured to determine how data is to be routed between devices associated with an environment. For example, the networking device 102(a) may be configured to send data to and receive data from multiple computing devices within an environment at the same time. For example, one device may be streaming video content while another device is being utilized for Internet browsing while another device is outputting streaming audio content, etc. The router component and/or switch component 204 may determine what data is to be sent to which devices within the environment, and which antennas 118 are to be utilized to send and receive such data. The router component and/or switch component 204 may additionally, or alternatively, be configured to connect devices on a computer network by using packet switching to receive, process, and forward data to a destination device. The adapter 206 may be configured to convert data received from one or more computing devices and/or from a modem into a compatible physical transmission standard.

As to the components of the memory 116, a time-stamp component of computing devices may generate a time stamp indicating when, as determined by a clock of the computing device in question, data is sent to the networking device 102(a) selected as the time master. The data, including the time stamp, may be received by the networking device 102(a), which may generate its own time stamp, such as utilizing the time-stamp component 124, indicating when the networking device 102(a) received the data from the computing device. The networking device 102(a) may send data to the computing device with an additional time stamp indicating when the data is sent to the computing device according to a clock of the networking device 102(a). This process may be repeated multiple times such that the networking device 102(a) receives and generates multiple time stamps for when data is received and sent as between the networking device 102(a) and the computing device in question.

The time-mastership component 126 may be configured to control the sending of data, including time stamps, between the networking device 102(a) and the computing devices. The time-mastership component 126 may cause the time-stamp component 124 to generate one or more time stamps, and/or the time-mastership component 126 may send a command to the computing devices instructing the computing devices to generate time stamps and send data, including those time stamps, to the networking device 102(a).

The time-synchronization component 128 may be configured to determine differences in time keeping as performed by the networking device 102(a) selected as the time master and time keeping performed by other devices in the system 100, such as the computing devices and/or other networking devices. Differences in time keeping performed between various devices may be determined by the time-synchronization component 128. The time-synchronization component 128 may determine, utilizing the time stamps, an association between time keeping performed by a first clock of the networking device 102(a) and time keeping performed by a second clock of a computing device. The association may indicate differences in time keeping and/or parameters associated with time keeping as between the networking device 102(a) and the computing device. The operations may also include synchronizing time with the computing device utilizing the association. Time synchronization may include determining one or more delays, and/or delay durations, to be included in a process flow associated with data sent from the networking device 102(a) to the computing devices 104(a)-(c) such that when the data is received and processed by the computing devices 104(a)-(c), output of content occurs at the computing devices 104(a)-(c) in a time-synchronized manner with the output of content by one or more other computing devices 104(a)-(c).

In examples, a given environment may include more than one networking device. In these examples, selection of one of the networking devices to serve as the time master may be performed, such as by the time-mastership component 126. To determine which of the networking devices will be selected as the time master, one or more operations may be performed and/or one or more factors may be utilized. For example, a given networking device may determine data indicating a first device type of a given computing device in communication with the networking device 102(a). The device type may indicate abilities, hardware, and/or functionalities that the computing device is configured to perform. For example, a given computing device may be configured to output audio, and/or output images, and/or to perform surround sound functionality. Determining the device type may include receiving data from the computing device indicating its device type and/or its hardware and/or abilities and/or determining the device type may be based at least in part on information received from the remote system and/or information received via a user device, such as a mobile device utilized when setting up and/or interacting with the computing device. Additionally, the networking device 102(a) may receive, from a remote system, data indicating that a second networking device is in direct communication with a second computing device associated with another device type. The other device type may indicate an absence of audio-output ability by the second computing device. In these examples, the networking device 102(a) associated with the first computing device having the first device type may be selected instead of the networking device associated with the second computing device based at least in part on the second computing device being of the second device type. In these examples, the networking device 102(a) associated with computing devices that output audio, which may be devices where time synchronization is more important than at least some other types of devices, may be selected over other networking devices associated with computing devices that do not output audio.

Additionally, or alternatively, selection of a networking device 102(a) as the time master may include determining data indicating a first number of computing devices in direct communication with a given networking device 102(a) without any intervening devices receiving and/or relaying information between the computing devices and the networking device. This data may be received from the computing devices, generated by the networking device 102(a), and/or may be received from the remote system. Additional data may be received, such as from the remote system, indicating a second number of computing devices in direct communication with another networking device without any intervening devices receiving and/or relaying information between the computing devices and the networking device. In examples, the first number of computing devices may be greater than the second number of computing devices, indicating that the first networking device communicates with more computing devices than the second networking device. In these examples, the networking device associated with the most computing devices may be selected as the time master.

Additionally, or alternatively, selection of a networking device 102(a) as the time master may include determining data indicating a first number of communications within a given period of time between a first networking device 102(a) and a computing device in direct communication with the first networking device 102(a) without any intervening devices receiving and/or relaying information between the computing devices and the networking device. Determining this data may include receiving the data from the computing device, generating the data by the first networking device 102(a), and/or receiving the data from the remote system. Additionally, data indicating a second number of communications within a given period of time between a second networking device and a second computing device may be received. In examples, the first number of communications may be more than the second number of communications. In other examples, the first number of communications may satisfy a threshold number of communications while the second number of communications may not satisfy the threshold number of communications. In these examples, the networking device 102(a) associated with the computing device that communicates with the networking device 102(a) most frequently may be selected as the time master.

Additionally, or alternatively, selection of a networking device 102(a) as the time master may include receiving data indicating first wireless communication abilities of a first computing device associated with a first networking device 102(a). Additionally, data indicating second wireless communication abilities of a second computing device associated with a second networking device may be received. In examples, the first wireless communication abilities of the first computing device may be less favorable than the second wireless communication abilities of the second computing device. For example, the communication hardware associated with the first computing device may utilize outdated communication protocols, may not include components that the communication hardware of the second computing device contains, the communication hardware may be configured to operate utilizing limited communication protocols, etc. In these examples, the networking device 102(a) associated with the less favorable wireless communication abilities may be selected as the time master. By so doing, the networking device 102(*a*) associated with devices with less favorable wireless communication abilities may be selected to ease time synchronization with such computing devices.

Additionally, or alternatively, selection of a networking device 102(*a*) as the time master may include determining that a wired connection between a first networking device 102(*a*) and a modem is established. For example, at least a portion of a network cable may be determined to be received in the network-cable port 122 of the first networking device 102(*a*) and the networking device 102(*a*) may be receiving data from the modem via the network cable. A network cable may include, for example, an Ethernet cable, a fiberoptic cable, a serial cable, a coaxial cable, etc. Additionally, data indicating an absence of a wired connection between a second networking device and the modem may be received, such as from the second networking device and/or from the remote system. In these examples, the first networking device 102(*a*) may be selected as the time master based at least in part on the first networking device 102(*a*) having a wired connection with the modem while the other networking device does not have a wired connection with the modem.

Additionally, or alternatively, a determination may be made that a new computing device has been added to a network associated with the networking devices. For example, an internet-of-things device, also described herein as an accessory device, may be added to an environment, such as a smart light bulb, smart plug, appliance, voice-enabled device, set-top box, speaker, thermostat, doorbell, lock, television, watch, etc. Based at least in part on the new device communicating with one or more networking devices, and/or based at least in part on data from the new device and/or from the remote system indicating that such a device has been added to the network, selection of a networking device 102(*a*) as the time master may be determined. For example, a first networking device 102(*a*) may receive data indicating that a number of computing devices in direct communication with a second networking device without any intervening devices receiving and/or relaying information between the computing devices and the networking device has increased from a first number of computing devices to a second number of computing devices. The networking device 102(*a*) may determine that the second number of computing devices is greater than a third number of computing devices in direct communication with the first networking device 102(*a*) without any intervening devices receiving and/or relaying information between the computing devices and the networking device. In these examples, it may be determined that the second networking device is more favorable to act as the time master and the second networking device may be selected as the time master for subsequent time synchronization. This dynamic determination of which networking device should act as the time master may be based on the number of computing devices in communication with networking devices and/or the determination may be based at least in part on an indication that the networking device with a wired connection to a modem has changed, and/or the device type of a new device, and/or a change in the number of communications within a given period of time between networking devices and devices, for example.

Additionally, or alternatively, selection of a networking device 102(*a*) as a content-distribution master may be performed. For example, the networking device 102(*a*) selected as the time master may be selected as a content-distribution master, which may be based at least in part on the networking device 102(*a*) being selected as the time master. In these examples, a content-distribution master component 130 may send instances of audio-data packets to the one or more computing devices in a time-synchronous manner utilizing the determined associations between time kept by the non-master devices and the networking device 102(*a*).

For example, the networking device 102(*a*) may act as a content-distribution master and may second a first instance of audio data to a first computing device 104(*a*) configured to output audio corresponding to the audio data. For example, the user may request and/or the networking device 102(*a*) may determine that the first computing device 104(*a*) with audio-output capabilities is to output audio corresponding to the audio data.

The networking device 102(*a*) may also send, to a second computing device 104(*b*) configured to output the audio, a second instance of the audio data in a time-synchronous manner with sending the first instance of the audio data to the first computing device 104(*a*). For example, two computing devices may be requested to output the audio. By way of example, the two computing devices may be components of a surround sound system where the audio and/or different portions of the audio may be output by given speakers in the surround sound system. By way of additional example, the two computing devices may be disposed in different rooms of an environment but may output the audio in a whole-hole audio system. Output of the audio at or near the same time such that the same audio is output by the multiple speakers may be advantageous for a listening experience of the user. As such, time synchronization as described herein between the networking device 102(*a*) and the other computing devices may be performed such that the audio data is sent and/or processed at given times for corresponding audio to be output in a time-synchronous manner.

Additionally, in examples, the networking device 102(*a*) may send, utilizing a router component and while sending the first instance of the audio data and sending the second instance of the audio data, network data representing content other than the audio data to a third computing device 104(*c*). For example, given that the device acting as the time master is also a networking device, the networking device 102(*a*) may be configured to perform the operations associated with being a time master in parallel with performing other operations associated with a networking device 102(*a*), such as the sending and receiving of network data from a modem and/or from other computing devices. For example, the networking device 102(*a*) may perform time-mastership operations in parallel with sending content to a mobile phone and receiving input data for web browsing on a laptop device.

FIGS. 3-7 illustrate processes for device time synchronization via networking devices. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2, 8, and 9, although the processes may be implemented in a wide variety of other environments, architectures and systems.

Figure 3:
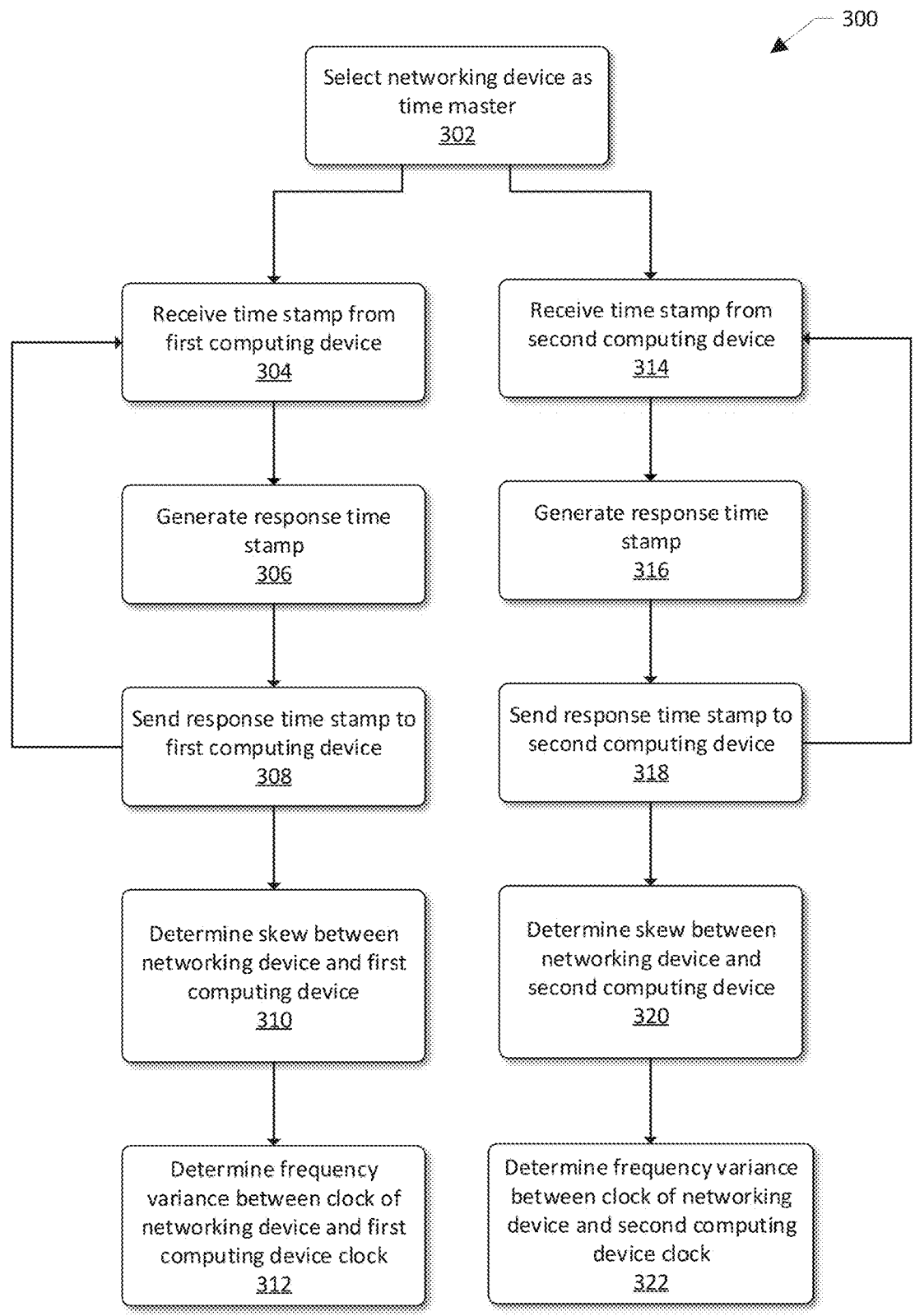
FIG. 3 illustrates a flow diagram of an example process for device time synchronization by networking devices.

FIG. 3 illustrates a flow diagram of an example process 300 for device time synchronization by networking devices. The order in which the operations or steps are described is not intended to be construed as a limitation, and any number of the described operations may be combined in any order and/or in parallel to implement process 300.

At block 302, the process 300 may include selecting a networking device as a time master. In examples, a given environment may include more than one networking device. In these examples, selection of one of the networking devices to serve as the time master may be performed, such as by a time-mastership component. To determine which of the networking devices will be selected as the time master, one or more operations may be performed and/or one or more factors may be utilized. For example, a given networking device may determine data indicating a first device type of a given computing device in communication with the networking device. The device type may indicate abilities, hardware, and/or functionalities that the computing device is configured to perform. For example, a given computing device may be configured to output audio, and/or output images, and/or to perform surround sound functionality. Determining the device type may include receiving data from the computing device indicating its device type and/or its hardware and/or abilities and/or determining the device type may be based at least in part on information received from the remote system and/or information received via a user device, such as a mobile device utilized when setting up and/or interacting with the computing device. Additionally, the networking device may receive, from a remote system, data indicating that a second networking device is in direct communication with a second computing device associated with another device type. The other device type may indicate an absence of audio-output ability by the second computing device. In these examples, the networking device associated with the first computing device having the first device type may be selected instead of the networking device associated with the second computing device based at least in part on the second computing device being of the second device type. In these examples, the networking device associated with computing devices that output audio, which may be devices where time synchronization is more important than at least some other types of devices, may be selected over other networking devices associated with computing devices that do not output audio.

Additionally, or alternatively, selection of a networking device as the time master may include determining data indicating a first number of computing devices in direct communication with a given networking device without any intervening devices receiving and/or relaying information between the computing devices and the networking device. This data may be received from the computing devices, generated by the networking device, and/or may be received from the remote system. Additional data may be received, such as from the remote system, indicating a second number of computing devices in direct communication with another networking device without any intervening devices receiving and/or relaying information between the computing devices and the networking device. In examples, the first number of computing devices may be greater than the second number of computing devices, indicating that the first networking device communicates with more computing devices than the second networking device. In these examples, the networking device associated with the most computing devices may be selected as the time master.

Additionally, or alternatively, selection of a networking device as the time master may include determining data indicating a first number of communications within a given period of time between a first networking device and a computing device in direct communication with the first networking device without any intervening devices receiving and/or relaying information between the computing devices and the networking device. Determining this data may include receiving the data from the computing device, generating the data by the first networking device, and/or receiving the data from the remote system. Additionally, data indicating a second number of communications within a given period of time between a second networking device and a second computing device may be received. In examples, the first number of communications may be more than the second number of communications. In other examples, the first number of communications may satisfy a threshold number of communications while the second number of communications may not satisfy the threshold number of communications. In these examples, the networking device associated with the computing device that communicates with the networking device most frequently may be selected as the time master.

Additionally, or alternatively, selection of a networking device as the time master may include receiving data indicating first wireless communication abilities of a first computing device associated with a first networking device. Additionally, data indicating second wireless communication abilities of a second computing device associated with a second networking device may be received. In examples, the first wireless communication abilities of the first computing device may be less favorable than the second wireless communication abilities of the second computing device. For example, the communication hardware associated with the first computing device may utilize outdated communication protocols, may not include components that the communication hardware of the second computing device contains, the communication hardware may be configured to operate utilizing limited communication protocols, etc. In these examples, the networking device associated with the less favorable wireless communication abilities may be selected as the time master. By so doing, the networking device associated with devices with less favorable wireless communication abilities may be selected to ease time synchronization with such computing devices.

Additionally, or alternatively, selection of a networking device as the time master may include determining that a wired connection between a first networking device and a modem is established. For example, at least a portion of a network cable may be determined to be received in the network-cable port of the first networking device and the networking device may be receiving data from the modem via the network cable. A network cable may include, for example, an Ethernet cable, a fiberoptic cable, a serial cable, a coaxial cable, etc. Additionally, data indicating an absence of a wired connection between a second networking device and the modem may be received, such as from the second networking device and/or from the remote system. In these examples, the first networking device may be selected as the time master based at least in part on the first networking device having a wired connection with the modem while the other networking device does not have a wired connection with the modem.

Additionally, or alternatively, a determination may be made that a new computing device has been added to a network associated with the networking devices. For example, an internet-of-things device, also described herein as an accessory device, may be added to an environment, such as a smart light bulb, smart plug, appliance, voice-enabled device, set-top box, speaker, thermostat, doorbell, lock, television, watch, etc. Based at least in part on the new device communicating with one or more networking devices, and/or based at least in part on data from the new device and/or from the remote system indicating that such a device has been added to the network, selection of a networking device as the time master may be determined. For example, a first networking device may receive data indicating that a number of computing devices in direct communication with a second networking device without any intervening devices receiving and/or relaying information between the computing devices and the networking device has increased from a first number of computing devices to a second number of computing devices. The networking device may determine that the second number of computing devices is greater than a third number of computing devices in direct communication with the first networking device without any intervening devices receiving and/or relaying information between the computing devices and the networking device. In these examples, it may be determined that the second networking device is more favorable to act as the time master and the second networking device may be selected as the time master for subsequent time synchronization. This dynamic determination of which networking device should act as the time master may be based on the number of computing devices in communication with networking devices and/or the determination may be based at least in part on an indication that the networking device with a wired connection to a modem has changed, and/or the device type of a new device, and/or a change in the number of communications within a given period of time between networking devices and devices, for example.

At block 304, the process 300 may include receiving a time stamp from a first computing device. For example, a time-stamp component of computing devices may generate a time stamp indicating when, as determined by a clock of the computing device in question, data is sent to the networking device selected as the time master. The data, including the time stamp, may be received by the networking device.

At block 306, the process 300 may include generating a response time stamp. For example, a time-stamp component of the networking device may generate its own time stamp, otherwise described as a response time stamp, indicating when the networking device received the data from the computing device.

At block 308, the process 300 may include sending the response time stamp to the first computing device. For example, the networking device may send data to the computing device with an additional time stamp indicating when the data is sent to the computing device according to a clock of the networking device. This process may be repeated multiple times such that the networking device receives and generates multiple time stamps for when data is received and sent as between the networking device and the computing device in question.

A time-mastership component of the networking device may be configured to control the sending of data, including time stamps, between the networking device and the computing devices. The time-mastership component may cause the time-stamp component to generate one or more time stamps, and/or the time-mastership component may send a command to the computing devices instructing the computing devices to generate time stamps and send data, including those time stamps, to the networking device.

At block 310, the process 300 may include determining a skew between a networking device acting as the time master and the first computing device. For example, a time-synchronization component of the first computing device may be configured to determine differences in time keeping as performed by the networking device selected as the time master and time keeping performed by the first computing device. Differences in time keeping performed between various devices may be determined by the time-synchronization component. Skew may represent an offset between two timers, counters, and/or clocks at a given time.

At block 312, the process 300 may include determining one or more frequency variances between clocks of the networking device and the first computing device. For example, the clock of the networking device and the clock of the first computing device may include a 10 MHz clock, but there may be a slight frequency variance as between the two clocks. For example, the frequency of the time master clock may be 10.0001 MHz while the frequency of the non-master clock may be 9.9999. This frequency variance, if left unchecked may lead to drift between time keeping performed by the time master and the other device such that, over time, the difference in time keeping would be noticeable and substantial. An association between the two clocks may be determined utilizing the skew and the frequency variance such that both may be accounted for when synchronizing time between devices. The operations may also include synchronizing time with the computing device utilizing the association. Time synchronization may include determining one or more delays, and/or delay durations, to be included in a process flow associated with data sent from the networking device 102(a) to the computing devices 104(a)-(c) such that when the data is received and processed by the computing devices 104(a)-(c), output of content occurs at the computing devices 104(a)-(c) in a time-synchronized manner with the output of content by one or more other computing devices 104(a)-(c).

At block 314, the process 300 may include receiving a time stamp from the second computing device. Receiving the time stamp from the second computing device may be performed in the same or a similar manner as receiving the time stamp from the first computing device.

At block 316, the process 300 may include generating a response time stamp. Generating the response time stamp with respect to the second computing device may be performed in the same or a similar manner as generating the response time stamp with respect to the first computing device.

At block 318, the process 300 may include sending the response time stamp to the second computing device. Sending the response time stamp to the second computing device may be performed in the same or a similar manner as sending the response time stamp to the first computing device. The processes described with respect to blocks 314-318 may be repeated multiple times such that multiple time stamps are received, sent, and/or generated by the time master.

At block 320, the process 300 may include determining a skew between the networking device acting as the time master and the second computing device. Determining the skew between the networking device and the second computing device may be performed in the same or a similar manner as determining the skew between the networking device and the first computing device. However, given that the second computing device will be positioned in a different location than the first computing device and/or be configured in a potentially different manner than the first computing device, the skew between the second computing device and the networking device will likely differ from the skew between the first computing device and the networking device.

At block 322, the process 300 may include determining a frequency variance between the networking device clock and the second computing device clock. Determining frequency variance between the networking device clock and the second computing device clock may be performed in the same or a similar manner as determining the frequency variance between the networking device clock and the first computing device clock.

It should be understood that the processes described with respect to blocks 314-322 may be performed at the same or a similar time as the processes described with respect to blocks 304-312.

Figure 4:
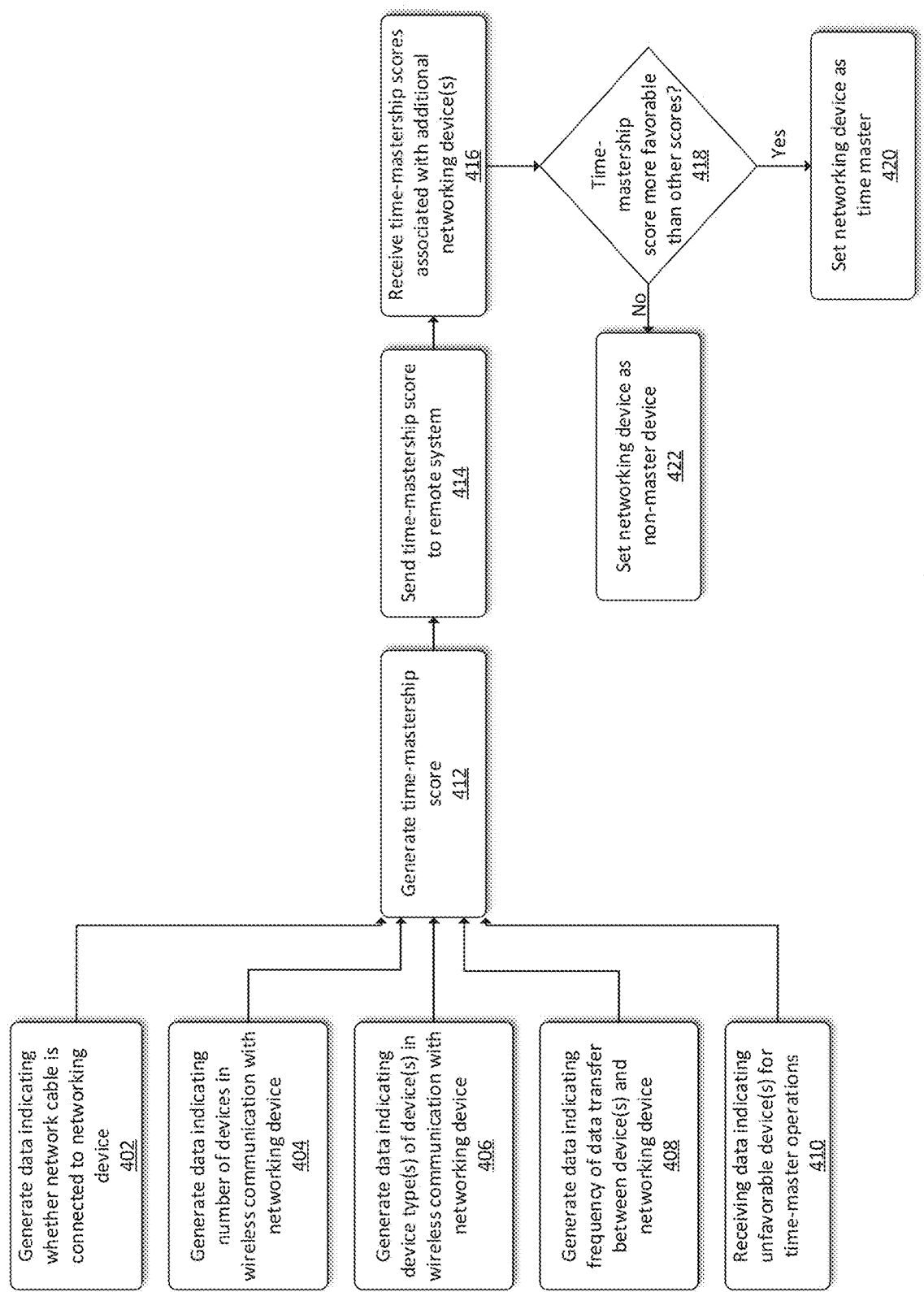
FIG. 4 illustrates a flow diagram of an example process for selecting a networking device to perform device time synchronization.

FIG. 4 illustrates a flow diagram of an example process 400 for selecting a networking device to perform device time synchronization. The order in which the operations or steps are described is not intended to be construed as a limitation, and any number of the described operations may be combined in any order and/or in parallel to implement process 400.

At block 402, the process 400 may include generating data indicating whether a network cable is connected to a networking device. For example, at least a portion of a network cable may be determined to be received in the network-cable port of the first networking device and the networking device may be receiving data from the modem via the network cable. A network cable may include, for example, an Ethernet cable, a fiberoptic cable, a serial cable, a coaxial cable, etc. Additionally, data indicating an absence of a wired connection between a second networking device and the modem may be received, such as from the second networking device and/or from the remote system. In these examples, data indicating that the network cable is connected to the networking device may be generated and may be utilized for selecting a networking device as a time master.

At block 404, the process 400 may include generating data indicating a number of devices in direct communication with the networking device without any intervening devices receiving and/or relaying information between the computing devices and the networking device. For example, a determination may be made as to a first number of computing devices in direct communication with a given networking device without any intervening devices receiving and/or relaying information between the computing devices and the networking device. This data may be received from the computing devices, generated by the networking device, and/or may be received from the remote system. Additional data may be received, such as from the remote system, indicating a second number of computing devices in direct communication with another networking device without any intervening devices receiving and/or relaying information between the computing devices and the networking device. In these examples, the networking device associated with the most computing devices may be considered a more favorable networking device to select as the time master than networking devices with fewer computing devices in direct communication. In these examples, data indicating the number of devices in direct communication with the networking device may be generated and may be utilized for selecting a networking device as a time master.

At block 406, the process 400 may include generating data indicating one or more device types of one or more devices in direct communication with the networking device. For example, the device type may indicate abilities, hardware, and/or functionalities that the computing device is configured to perform. For example, a given computing device may be configured to output audio, and/or output images, and/or to perform surround sound functionality. Determining the device type may include receiving data from the computing device indicating its device type and/or its hardware and/or abilities and/or determining the device type may be based at least in part on information received from the remote system and/or information received via a user device, such as a mobile device utilized when setting up and/or interacting with the computing device. Other device types may indicate an absence of audio-output ability by the second computing device. In these examples, the networking device associated with the computing device having the first device type may be selected instead of the networking device associated with the computing device based at least in part on the second computing device being of the second device type. In these examples, data indicating the device type may be generated and may be utilized for selecting a networking device as a time master.

At block 408, the process 400 may include generating data indicating an amount of data transfer between one or more devices and the networking device. For example, a first number of communications within a given period of time between a first networking device and a computing device in direct communication with the first networking device may be received, determined, and/or generated. Determining this data may include receiving the data from the computing device, generating the data by the first networking device, and/or receiving the data from the remote system. In examples where the first number of communications may be more than a second number of communications between devices associated with a second networking device, the networking device with the most frequent communication with computing devices may be selected as the time master. In these examples, data indicating the number of device communications within a given period of time with a networking device may be generated and may be utilized for selecting a networking device as a time master.

At block 410, the process 400 may include receiving data indicating one or more unfavorable devices for time-master operations. For example, data indicating first wireless communication abilities of a first computing device associated with a first networking device may be determined. Additionally, data indicating second wireless communication abilities of a second computing device associated with a second networking device may be received. In examples, the first wireless communication abilities of the first computing device may be less favorable than the second wireless communication abilities of the second computing device. For example, the communication hardware associated with the first computing device may utilize outdated communication protocols, may not include components that the communication hardware of the second computing device contains, the communication hardware may be configured to operate utilizing limited communication protocols, etc. In these examples, the networking device associated with the less favorable wireless communication abilities may be more favorable as the time master as compared to the other networking devices. In these examples, data indicating the wireless communication abilities may be generated and may be utilized for selecting a networking device as a time master.

At block 412, the process 400 may include generating a time-mastership score associated with a networking device. For example, the data generated in association with blocks 402-410 may be utilized to determine the time-mastership score. Some or all of the factors may also be weighted based at least in part on predefined priorities, user settings, and/or based on historical data indicating favorability of various networking devices selected as time masters. The data may also be utilized as input into one or more machine learning models, which may analyze the data and determine, as output, the time-mastership score.

At block 414, the process 400 may include sending the time-mastership score to a remote system. In other examples, the time-mastership score may be sent to other networking devices without being sent to the remote system.

At block 416, the process 400 may include receiving time-mastership scores associated with additional networking devices, such as from the remote system and/or from the additional networking devices. Having generated the time-mastership score associated with the first networking device and having received the time-mastership scores associated with the other networking devices in the environment, a determination of which networking device is most favorable to act as the time master may be made.

At block 418, the process 400 may include determining whether the time-mastership score associated with a given networking device is more favorable than the time-mastership scores associated with other networking devices. In examples, the time-mastership scores may be ranked such that the most favorable time-mastership score is ranked highest.

If the time-mastership score associated with the given networking device is more favorable than the time-mastership scores associated with the other networking devices, then at block 420 the process 400 may include selecting the given networking device as the time master.

If the time-mastership score associated with the given networking device is less favorable than at least one of the time-mastership scores associated with the other networking devices, then at block 422 the process 400 may include set the given networking device as a non-master device.

Figure 5:
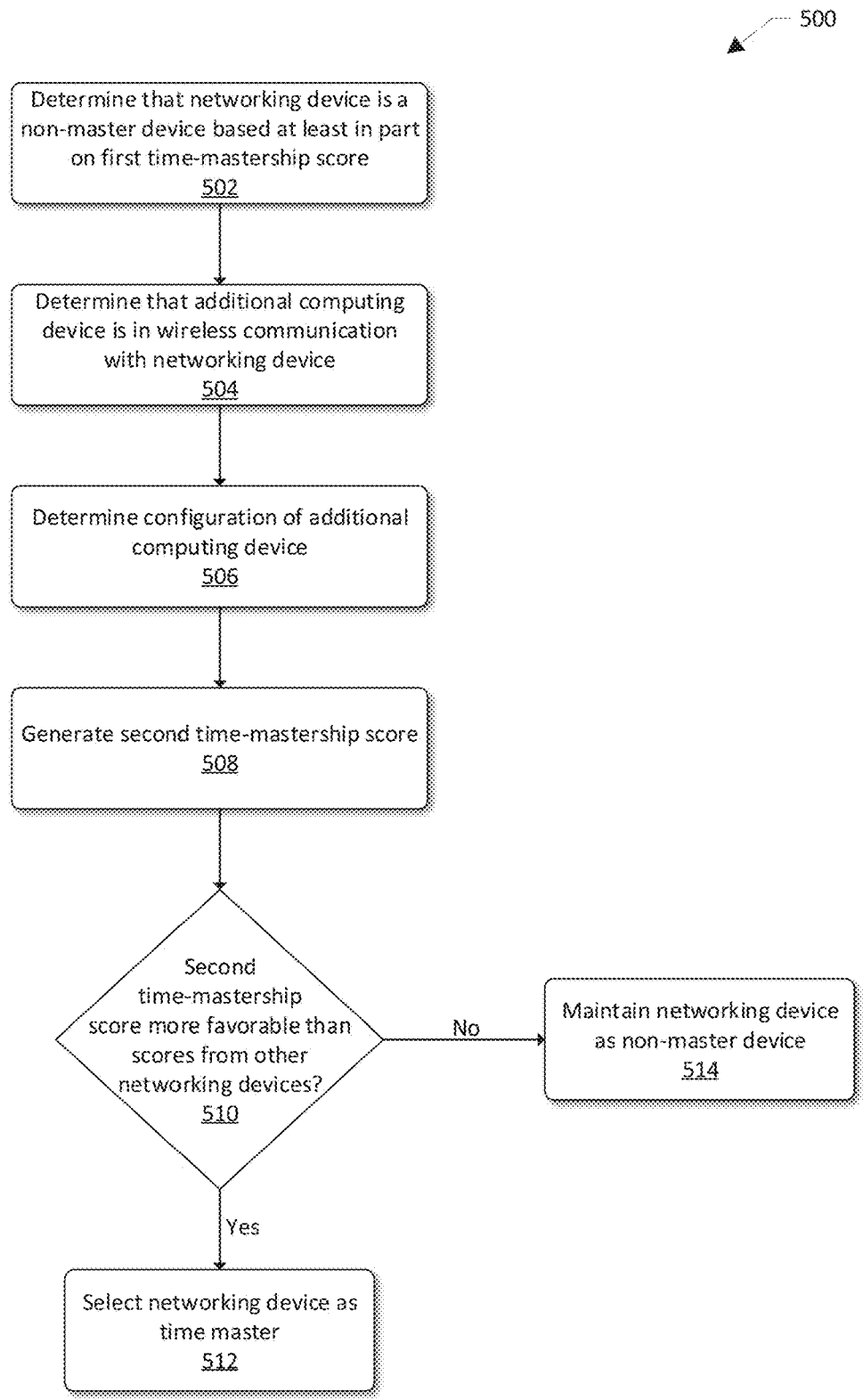
FIG. 5 illustrates a flow diagram of an example process for determining when to select a different networking device to perform device time synchronization.

FIG. 5 illustrates a flow diagram of an example process 500 for determining when to select a different networking device to perform device time synchronization. The order in which the operations or steps are described is not intended to be construed as a limitation, and any number of the described operations may be combined in any order and/or in parallel to implement process 500.

At block 502, the process 500 may include determining that a networking device is a non-master device based at least in part on a first time-mastership score. For example, the process described at least with respect to FIG. 4 may be utilized to determine time-mastership scores and to determine which networking device is to be selected to act as the time master based at least in part on the time-mastership scores.

At block 504, the process 500 may include determining that an additional computing device has established wireless communication with the networking device. For example, the additional computing device may be an Internet-of-things device that has started communicating with the networking device. Additionally, or alternatively, the networking device may receive a notification from the additional computing device, the remote system, and/or a user device that the additional computing device has been added to a user account associated with the networking device.

At block 506, the process 500 may include determining a configuration of the additional computing device. The configuration of the additional computing device may include a device type of the additional computing device, such as whether the additional computing device has audio-output capabilities. The configuration of the additional computing device may also include whether the device includes the most up-to-date and/or favorable hardware, such as antennas, the computing power of the device, the power source for the device, and whether the device is stationary or portable, for example.

At block 508, the process 500 may include generating a second time-mastership score. Generating the second time-mastership score may be performed, for example, utilizing the processes described with respect to at least FIG. 4, above.

At block 510, the process 500 may include determining whether the second time-mastership score is more favorable than time-mastership scores associated with other networking devices. For example, the networking device may have received the time-mastership scores associated with the other networking devices when the previous selection of a different networking device as the time master. The networking device may, having determined the new time-mastership score for itself, determine whether that new time-mastership score is more favorable that the other time-mastership scores.

If the second time-mastership score is more favorable than the other time-mastership scores, then at block 512 the process 500 may include selecting the networking device as the time master.

If the second time-mastership score is less favorable than at least one other time-mastership score, then at block 514 the process 500 may include maintaining the prior networking device as the non-master device.

Figure 6:
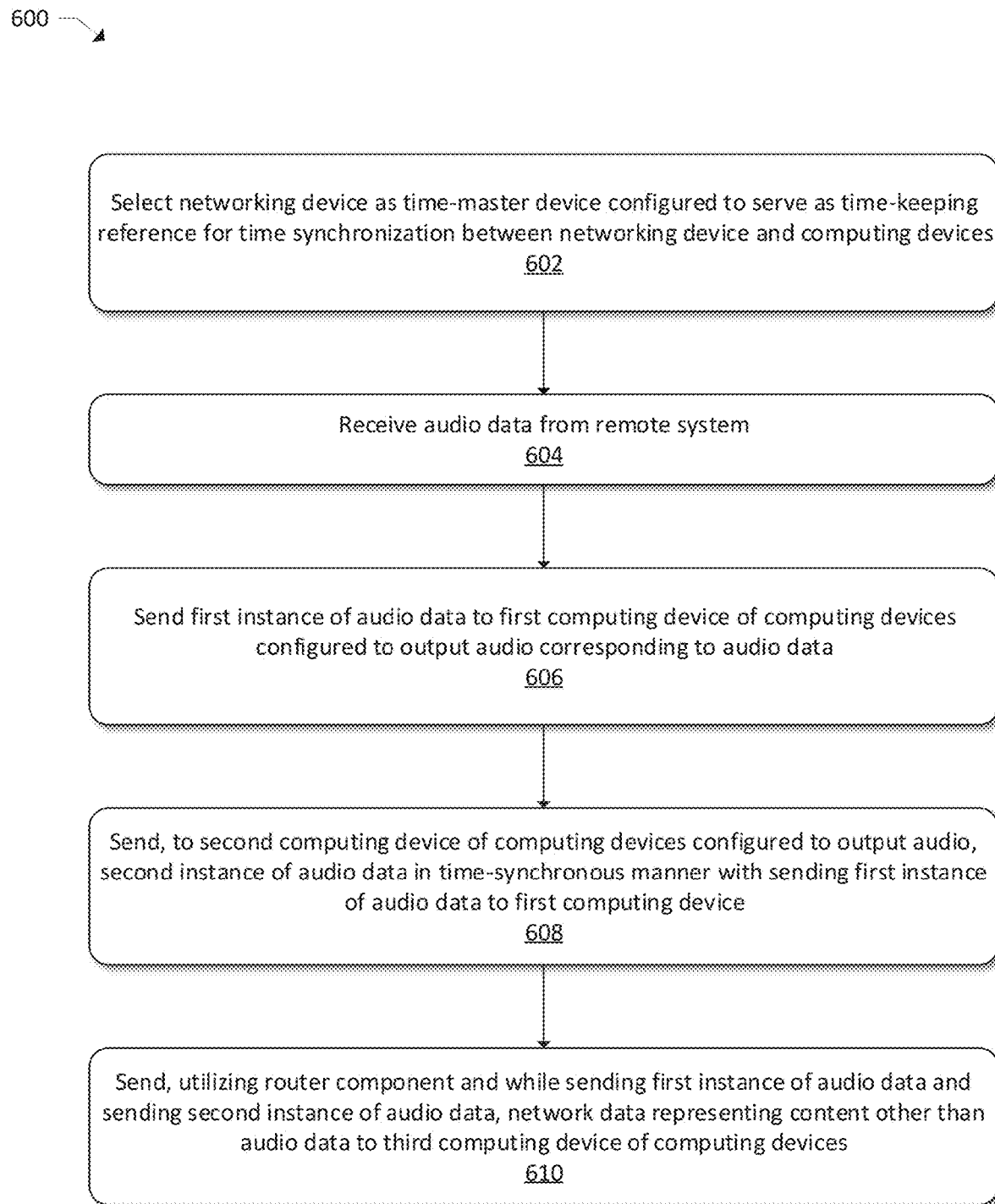
FIG. 6 illustrates a flow diagram of an example process for device time synchronization by networking devices.

FIG. 6 illustrates a flow diagram of an example process 600 for device time synchronization by networking devices. The order in which the operations or steps are described is not intended to be construed as a limitation, and any number of the described operations may be combined in any order and/or in parallel to implement process 600.

At block 602, the process 600 may include s selecting the networking device as a time-master device configured to serve as a time-keeping reference for time synchronization between the networking device and computing devices. Selection of the networking device may be based at least in part on one or more factors. For example, a given networking device may determine data indicating a first device type of a given computing device in communication with the networking device. The device type may indicate abilities, hardware, and/or functionalities that the computing device is configured to perform. For example, a given computing device may be configured to output audio, and/or output images, and/or to provide surround-sound functionality. Determining the device type may include receiving data from the computing device indicating its device type and/or its hardware and/or abilities, and/or determining the device type may be based at least in part on information received from a remote system and/or information received via a user device, such as a mobile device utilized when setting up and/or interacting with the computing device. Additionally, the networking device may receive, from a remote system, data indicating that a second networking device is in wireless communication with a second computing device associated with another device type. The other device type may indicate an absence of audio-output ability by the second computing device. In these examples, the networking device associated with the first computing device having the first device type may be selected instead of the networking device associated with the second computing device based at least in part on the second computing device being of the second device type. In these examples, the networking device associated with computing devices that output audio, which may be devices where time synchronization is more important than at least some other types of devices, may be selected over other networking devices associated with computing devices that do not output audio.

Additionally, or alternatively, selection of a networking device as the time master may include determining data indicating a first number of computing devices in direct communication with a given networking device. This data may be received from the computing devices, generated by the networking device, and/or may be received from a remote system. Additional data may be received, such as from the remote system, indicating a second number of computing devices that communicate directly with another networking device without any intervening devices receiving and/or relaying information between the computing devices and the networking device. It should be understood that when two devices are described herein as being in direct communication and/or communicating directly with each other, such disclosure includes instances where data is sent to and from the devices without an intermediary device, such as an access point, router, range extender, or other relay device receiving and/or sending the data. In examples, the first number of computing devices may be greater than the second number of computing devices, indicating that the first networking device communicates with more computing devices than the second networking device. In these examples, the networking device associated with the most computing devices may be selected as the time master.

Additionally, or alternatively, selection of a networking device as the time master may include determining data indicating a first frequency of communication (e.g., a first number of times devices communicated within a period of time) between a first networking device and a computing device in direct communication with the first networking device without any intervening devices receiving and/or relaying information between the computing devices and the networking device. Determining this data may include receiving the data from the computing device, generating the data by the first networking device, and/or receiving the data from a remote system. Additionally, data indicating a second number of times a second networking device and a second computing device communicate with each other within a given period of time may be received. In examples, the first number of communications may be more than the second number of communications. In other examples, the first number of communications may satisfy a threshold number of communications while the second number of communications may not satisfy the threshold number of communications. In these examples, the networking device associated with the computing device that communicates with the networking device most frequently may be selected as the time master.

Additionally, or alternatively, selection of a networking device as the time master may include receiving data indicating first wireless communication abilities of a first computing device associated with a first networking device. Additionally, data indicating second wireless communication abilities of a second computing device associated with a second networking device may be received. In examples, the first wireless communication abilities of the first computing device may be less favorable than the second wireless communication abilities of the second computing device. For example, the communication hardware associated with the first computing device may utilize outdated communication protocols, may not include components that the communication hardware of the second computing device contains, the communication hardware may be configured to operate utilizing limited communication protocols, etc. In these examples, the networking device associated with the less favorable wireless communication abilities may be selected as the time master. By so doing, the networking device associated with devices with less favorable wireless communication abilities may be selected to ease time synchronization with such computing devices.

Additionally, or alternatively, selection of a networking device as the time master may include determining that a wired connection between a first networking device and a modem is established. For example, at least a portion of a network cable may be determined to be received in a network-cable port of the first networking device and the networking device may be receiving data from the modem via the network cable. A network cable may include, for example, an Ethernet cable, a fiberoptic cable, a serial cable, a coaxial cable, etc. Additionally, data indicating an absence of a wired connection between a second networking device and the modem may be received, such as from the second networking device and/or from a remote system. In these examples, the first networking device may be selected as the time master based at least in part on the first networking device having a wired connection with the modem while the other networking device does not have a wired connection with the modem.

The process 600 may include receiving, in response to the networking device being selected as the time-master device and directly from the computing device, first data including a first time stamp indicating when the computing device sent the first data according to a second clock of the computing device. For example, the data may be received at a networking device, and the data may be received from a computing device disposed in an environment that includes the networking device. The networking device and the computing device may each have their own clock. A time-stamp component of the computing device may generate the time stamp, which may be sent to the networking device.

The process 600 may include sending, to the computing device and in response to receiving the first data, second data including a second time stamp indicating when the second data was sent to the computing device according to the first clock. Time synchronization may be performed and may include determining one or more delays, and/or delay durations, to be included in a process flow associated with data sent from the networking device to the computing devices such that when the data is received and processed by the computing devices, output of content occurs at the computing devices in a time-synchronized manner with the output of content by one or more other computing devices.

At block 604, the process 600 may include receiving audio data, from as from a remote system. For example, a user may have requested certain content, such as audio representing a song, for example. A remote system may retrieve the requested content and may provide that to the networking device and/or one or more other computing devices associated with the networking device.

At block 606, the process 600 may include sending a first instance of the audio data to a first computing device of the computing devices configured to output audio corresponding to the audio data. For example, the user may request and/or the networking device may determine that a first computing device with audio-output capabilities is to output audio corresponding to the audio data.

At block 608, the process 600 may include sending, to a second computing device of the computing devices configured to output the audio, a second instance of the audio data in a time-synchronous manner with sending the first instance of the audio data to the first computing device. For example, two computing devices may be requested to output the audio. By way of example, the two computing devices may be components of a surround sound system where the audio and/or different portions of the audio may be output by given speakers in the surround sound system. By way of additional example, the two computing devices may be disposed in different rooms of an environment but may output the audio in a whole-hole audio system. Output of the audio at or near the same time such that the same audio is output by the multiple speakers may be advantageous for a listening experience of the user. As such, time synchronization as described herein between the networking device and the other computing devices may be performed such that the audio data is sent and/or processed at given times for corresponding audio to be output in a time-synchronous manner.

At block 610, the process 600 may include sending, utilizing the router component and while sending the first instance of the audio data and sending the second instance of the audio data, network data representing content other than the audio data to a third computing device of the computing devices. For example, given that the device acting as the time master is also a networking device, the networking device may be configured to perform the operations associated with being a time master in parallel with performing other operations associated with a networking device, such as the sending and receiving of network data from a modem and/or from other computing devices. For example, the networking device may perform time-mastership operations in parallel with sending content to a mobile phone and receiving input data for web browsing on a laptop device.

Additionally, or alternatively, the process 600 may include determining first data indicating a first device type of the first computing device, the first device type indicating that the first computing device is configured to output audio. The process 600 may also include receiving second data indicating that a second networking device is in direct communication with a fourth computing device associated with a second device type, the second device type indicating absence of audio-output ability by the fourth computing device. The process 600 may also include in response to the second data, selecting the first networking device as the time-master device.

Additionally, or alternatively, the process 600 may include determining first data indicating a first number of the computing devices in direct communication with the first networking device. The process 600 may also include receiving second data indicating a second number of the computing devices in direct communication with a second networking device, the second number of the computing devices being fewer than the first number of the computing devices. The process 600 may also include in response to the second data, selecting the first networking device as the time-master device.

Additionally, or alternatively, the process 600 may include receiving first data indicating that a number of the computing devices in direct communication with a second networking device has increased from a first number of the computing devices to a second number of the computing devices. The process 600 may also include determining that the second number of the computing devices is greater than a third number of the computing devices in direct communication with the first networking device. The process 600 may also include, in response to determining that the second number of the computing devices is greater than the third number of the computing device, selecting the second networking device as the time-master device instead of the first networking device.

Figure 7:
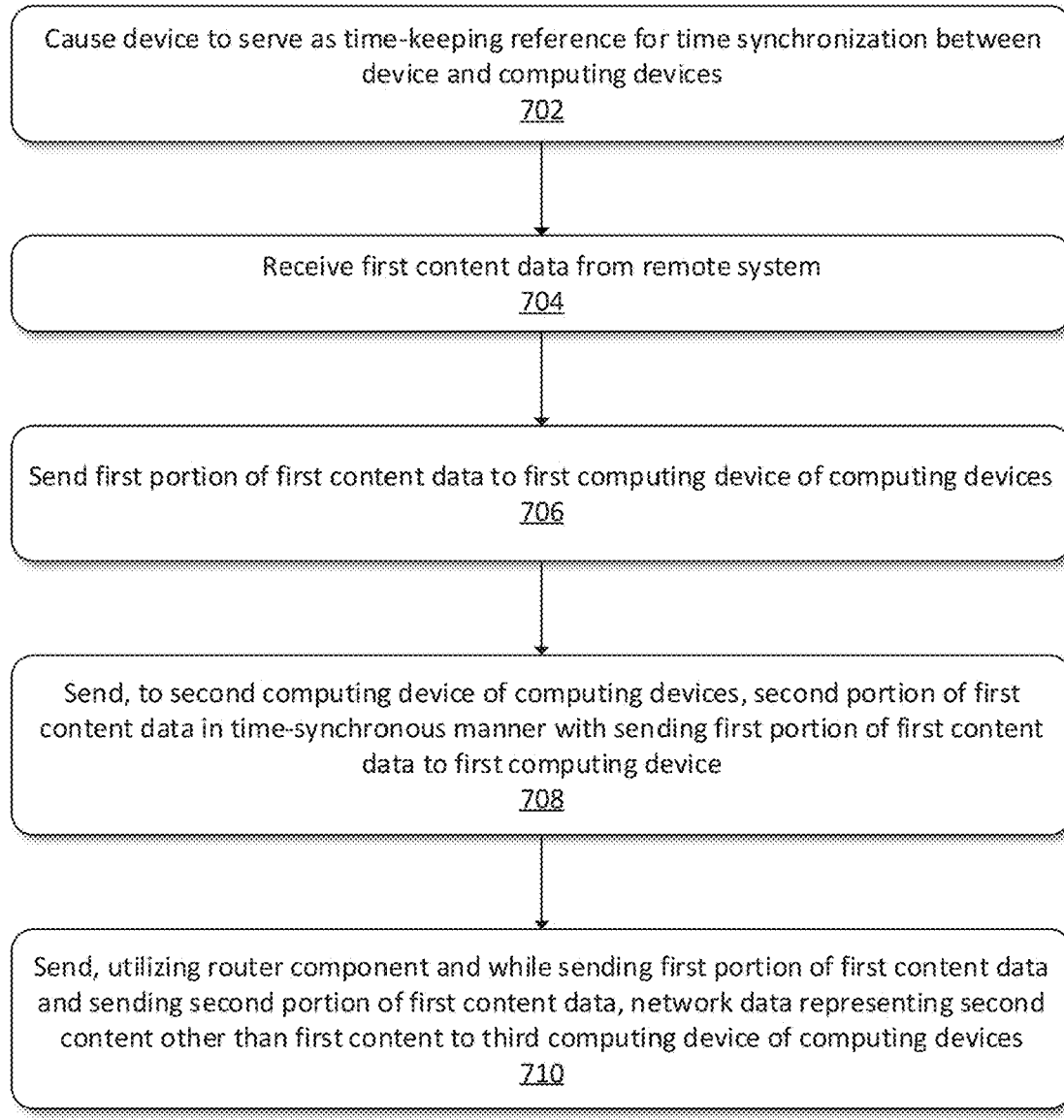
FIG. 7 illustrates a flow diagram of another example process for device time synchronization by networking devices.

FIG. 7 illustrates a flow diagram of another example process 700 for device time synchronization by networking devices. The order in which the operations or steps are described is not intended to be construed as a limitation, and any number of the described operations may be combined in any order and/or in parallel to implement process 700.

At block 702, the process 700 may include causing the device to serve as a time-keeping reference for time synchronization between the device and computing devices. Causing the device to serve as the time-keeping reference for time synchronization may include selecting a device such as a networking device as a time master based at least in part on one or more factors. For example, a given networking device may determine data indicating a first device type of a given computing device in communication with the networking device. The device type may indicate abilities, hardware, and/or functionalities that the computing device is configured to perform. For example, a given computing device may be configured to output audio, and/or output images, and/or to provide surround-sound functionality. Determining the device type may include receiving data from the computing device indicating its device type and/or its hardware and/or abilities, and/or determining the device type may be based at least in part on information received from a remote system and/or information received via a user device, such as a mobile device utilized when setting up and/or interacting with the computing device. Additionally, the networking device may receive, from a remote system, data indicating that a second networking device is in wireless communication with a second computing device associated with another device type. The other device type may indicate an absence of audio-output ability by the second computing device. In these examples, the networking device associated with the first computing device having the first device type may be selected instead of the networking device associated with the second computing device based at least in part on the second computing device being of the second device type. In these examples, the networking device associated with computing devices that output audio, which may be devices where time synchronization is more important than at least some other types of devices, may be selected over other networking devices associated with computing devices that do not output audio.

Additionally, or alternatively, selection of a networking device as the time master may include determining data indicating a first number of computing devices in direct communication with a given networking device. This data may be received from the computing devices, generated by the networking device, and/or may be received from a remote system. Additional data may be received, such as from the remote system, indicating a second number of computing devices that communicate directly with another networking device without any intervening devices receiving and/or relaying information between the computing devices and the networking device. It should be understood that when two devices are described herein as being in direct communication and/or communicating directly with each other, such disclosure includes instances where data is sent to and from the devices without an intermediary device, such as an access point, router, range extender, or other relay device receiving and/or sending the data. In examples, the first number of computing devices may be greater than the second number of computing devices, indicating that the first networking device communicates with more computing devices than the second networking device. In these examples, the networking device associated with the most computing devices may be selected as the time master.

Additionally, or alternatively, selection of a networking device as the time master may include determining data indicating a first frequency of communication (e.g., a first number of times devices communicated within a period of time) between a first networking device and a computing device in direct communication with the first networking device without any intervening devices receiving and/or relaying information between the computing devices and the networking device. Determining this data may include receiving the data from the computing device, generating the data by the first networking device, and/or receiving the data from a remote system. Additionally, data indicating a second number of times a second networking device and a second computing device communicate with each other within a given period of time may be received. In examples, the first number of communications may be more than the second number of communications. In other examples, the first number of communications may satisfy a threshold number of communications while the second number of communications may not satisfy the threshold number of communications. In these examples, the networking device associated with the computing device that communicates with the networking device most frequently may be selected as the time master.

Additionally, or alternatively, selection of a networking device as the time master may include receiving data indicating first wireless communication abilities of a first computing device associated with a first networking device. Additionally, data indicating second wireless communication abilities of a second computing device associated with a second networking device may be received. In examples, the first wireless communication abilities of the first computing device may be less favorable than the second wireless communication abilities of the second computing device. For example, the communication hardware associated with the first computing device may utilize outdated communication protocols, may not include components that the communication hardware of the second computing device contains, the communication hardware may be configured to operate utilizing limited communication protocols, etc. In these examples, the networking device associated with the less favorable wireless communication abilities may be selected as the time master. By so doing, the networking device associated with devices with less favorable wireless communication abilities may be selected to ease time synchronization with such computing devices.

Additionally, or alternatively, selection of a networking device as the time master may include determining that a wired connection between a first networking device and a modem is established. For example, at least a portion of a network cable may be determined to be received in a network-cable port of the first networking device and the networking device may be receiving data from the modem via the network cable. A network cable may include, for example, an Ethernet cable, a fiberoptic cable, a serial cable, a coaxial cable, etc. Additionally, data indicating an absence of a wired connection between a second networking device and the modem may be received, such as from the second networking device and/or from a remote system. In these examples, the first networking device may be selected as the time master based at least in part on the first networking device having a wired connection with the modem while the other networking device does not have a wired connection with the modem.

The process 700 may also include receiving, from a computing device and based at least in part on the device being selected as the time-master device, first data indicating time keeping performed by a second clock of the computing device. For example, the data may be received at a networking device, and the data may be received from a computing device disposed in an environment that includes the networking device. The networking device and the computing device may each have their own clock. A time-stamp component of the computing device may generate the time stamp, which may be sent to the networking device.

The process 700 may also include sending, to the computing device and based at least in part on receiving the first data, second data indicating time keeping performed by the first clock. Time synchronization may be performed and may include determining one or more delays, and/or delay durations, to be included in a process flow associated with data sent from the networking device to the computing devices such that when the data is received and processed by the computing devices, output of content occurs at the computing devices in a time-synchronized manner with the output of content by one or more other computing devices.

At block 704, the process 700 may include receiving first content data from a remote system. For example, a user may have requested certain content, such as audio representing a song, for example. A remote system may retrieve the requested content and may provide that to the networking device and/or one or more other computing devices associated with the networking device.

At block 706, the process 700 may include sending a first portion of the first content data to a first computing device of the computing devices. For example, the user may request and/or the networking device may determine that a first computing device with audio-output capabilities is to output audio corresponding to the audio data.

At block 708, the process 700 may include sending, to a second computing device of the computing devices, a second portion of the first content data in a time-synchronous manner with sending the first portion of the first content data to the first computing device. For example, two computing devices may be requested to output the audio. By way of example, the two computing devices may be components of a surround sound system where the audio and/or different portions of the audio may be output by given speakers in the surround sound system. By way of additional example, the two computing devices may be disposed in different rooms of an environment but may output the audio in a whole-hole audio system. Output of the audio at or near the same time such that the same audio is output by the multiple speakers may be advantageous for a listening experience of the user. As such, time synchronization as described herein between the networking device and the other computing devices may be performed such that the audio data is sent and/or processed at given times for corresponding audio to be output in a time-synchronous manner.

At block 710, the process 700 may include sending, utilizing the router component and while sending the first portion of the first content data and sending the second portion of the first content data, network data representing second content other than the first content to a third computing device of the computing devices. For example, given that the device acting as the time master is also a networking device, the networking device may be configured to perform the operations associated with being a time master in parallel with performing other operations associated with a networking device, such as the sending and receiving of network data from a modem and/or from other computing devices. For example, the networking device may perform time-mastership operations in parallel with sending content to a mobile phone and receiving input data for web browsing on a laptop device.

Additionally, or alternatively, the process 700 may include sending first data indicating a first device type of the first computing device, the first device type indicating that the first computing device is configured to output audio. The process 700 may also include receiving second data indicating that a second networking device is in direct communication with a fourth computing device associated with a second device type, the second device type indicating absence of audio-output ability by the fourth computing device. In these examples, selecting the first networking device to serve as the time-keeping reference may be based at least in part on the second data.

Additionally, or alternatively, the process 700 may include determining first data indicating a first number of the computing devices in direct communication with the first networking device. The process 700 may also include receiving second data indicating a second number of the computing devices in direct communication with a second networking device, the second number of the computing devices being fewer than the first number of the computing devices. In these examples, selecting the first networking device to serve as the time-keeping reference may be based at least in part on the second data.

Additionally, or alternatively, the process 700 may include receiving first data indicating that a number of the computing devices in direct communication with a second networking device has increased from a first number of the computing devices to a second number of the computing devices. The process 700 may also include determining that the second number of the computing devices is greater than a third number of the computing devices in direct communication with the first networking device. The process 700 may also include, based at least in part on determining that the second number of the computing devices is greater than the third number of the computing devices, selecting the second networking device to serve as the time-keeping reference.

Additionally, or alternatively, the process 700 may include determining first data indicating a first number of communications between the first networking device and the first computing device within a period of time. The process 700 may also include receiving second data indicating a second number of communications between a second networking device and a fourth computing device within the period of time. The process 700 may also include determining that the first number is more than the second number. In these examples, selecting the first networking device to serve as the time-keeping reference may be based at least in part on determining that the first number is more than the second number.

Additionally, or alternatively, the process 700 may include receiving second data indicating first wireless communication abilities of the first computing device. The process 700 may also include receiving second data indicating second wireless communication abilities of a fourth computing device in wireless communication with a second networking device. The process 700 may also include determining that the first wireless communication abilities are less favorable than the second wireless communication abilities. In these example, selecting the first networking device to serve as the time-keeping reference may be based at least in part on the first wireless communication abilities being less favorable than the second wireless communication abilities.

Additionally, or alternatively, the process 700 may include determining that a wired connection between the first networking device and a modem is established. The process 700 may also include receiving first data indicating an absence of the wired connection between a second networking device and the modem. The process 700 may also include selecting the first networking device to serve as the time-keeping reference may be based at least in part on the wired connection being established between the first networking device and the modem and the absence of the wired connection between the second networking device and the modem.

Additionally, or alternatively, the process 700 may include synchronizing time with a second computing device and identifying the device as a content-distribution master. The process 700 may also include sending, to the first computing device, a first instance of audio-data packets and sending, to the second computing device, a second instance of the audio-data packets in a time-synchronous manner with sending the first instance of the audio-data packets to the first computing device.

Additionally, or alternatively, the process 700 may include sending a third portion of the first content data corresponding to image data to a fourth computing device configured to display images corresponding to the image data, the third portion of the first content data sent in a time-synchronous manner with sending of the first portion of the first content data and the second portion of the first content data such that the images are displayed by the fourth computing device during output of the audio by the first computing device and the second computing device.

Figure 8:
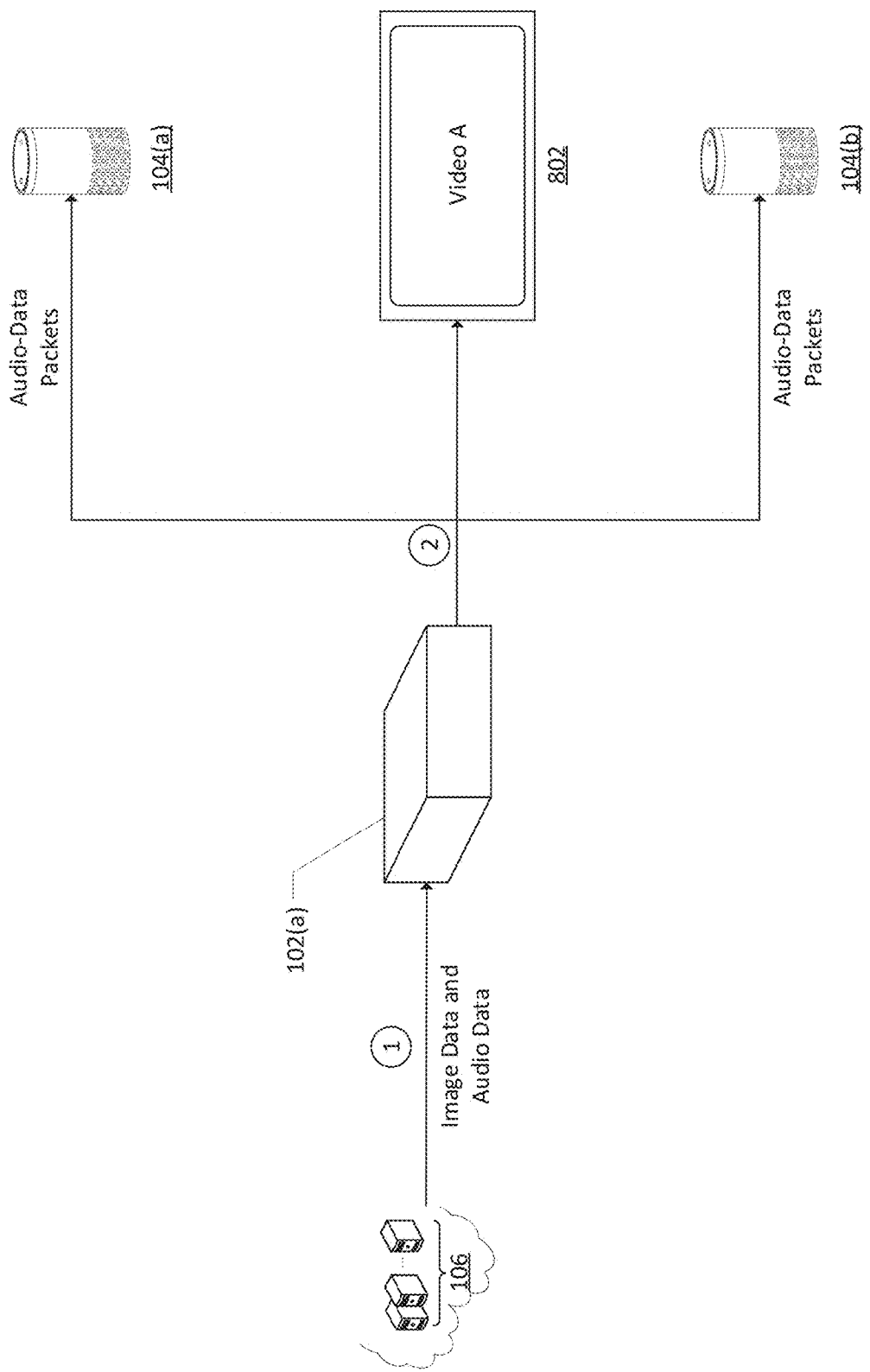
FIG. 8 illustrates a conceptual diagram of example components utilized for content-distribution mastership.

FIG. 8 illustrates a conceptual diagram of example components utilized for audio-device mastership. The system 800 may include at least some of the components of the system 100 from FIG. 1. For example, the system 800 may include a wireless networking device 102(*a*), one or more computing devices 104(*a*), 104(*b*), an imaging device 802, and/or a remote system 106. FIG. 8 depicts the exchange of information and/or the performance of processes via the various components utilizing steps 1 and 2. However, it should be understood that the processes may be performed in any order and need not be performed in sequential order as depicted in FIG. 8.

At step 1, content data, such as image data and audio data, may be sent from the remote system 106 to the networking device 102(*a*). By way of example, a user may request that content may be displayed and/or otherwise output utilizing devices located in an environment. The request may be from user input to, for example, a personal device such as a mobile phone, tablet, and/or computer, and/or the request may be from a user utterance spoken by the user and captured by a microphone of one or more of the devices 104(*a*)-(*b*) within the environment. For example, a user may provide input indicating an intent to play a video associated with a movie on a television within the environment while one or more other devices, such as audio-output devices, output audio corresponding to the movie. Input data corresponding to the input may be sent to, for example, the remote system 106 configured to retrieve content associated with the request. In examples where the input comprises a user utterance, audio data corresponding to the user utterance may be sent to the remote system 106. The speech-processing system may generate intent data indicating an intent associated with the user utterance. In the example where the user utterance indicates an intent to output content on the one or more devices 104(*a*)-(*b*), an A/V speechlet may receive the intent data and/or a payload associated with the intent data and may utilize that information to determine what content is to be provided to the networking device 102(*a*) for output. An A/V retrieval component may retrieve the requested content and the remote system 106 may send the content to the networking device 102(*a*). The content, in a given example may include image data and audio data. In other examples, the content may include just image data, just audio data, and/or other types of data, such as text data.

At step 2, the networking device 102(*a*) may send data packets, such as audio-data packets and/or image-data packets to the devices 104(*a*)-(*b*). For example, the networking device 102(*a*) may receive the content data and may send all or a portion of the content data to the devices 104(*a*)-(*b*), 802. For example, the content data may include audio data, which may be sent to the devices 104(*a*)-(*b*) and/or image data, which may be sent to the device 802. In these examples, the data may be sent to the devices 104(*a*)-(*b*), 802 as data packets utilizing one or more protocols. While numerous protocols may be utilized for packet transmission, the User Datagram Protocol (UDP) may be utilized to quickly transmit the packets. UDP allows for the use of checksums for data integrity and may utilize port identifiers for addressing different functions at the source and destination of the datagram.

Given that the networking device 102(*a*) is selected as the time master and the content-distribution master, the networking device 102(*a*) may utilize the associations between time kept by the networking device 102(*a*) and time kept by the devices 104(*a*)-(*b*), 802 to determine how and when to send audio packets to the devices 104(*a*)-(*b*) such that the audio is output by those devices in a time-synchronous manner and/or when to send image packets to the device 802 such that images are output by the device 802 in a time-synchronous manner with output of the audio.

Figure 9:
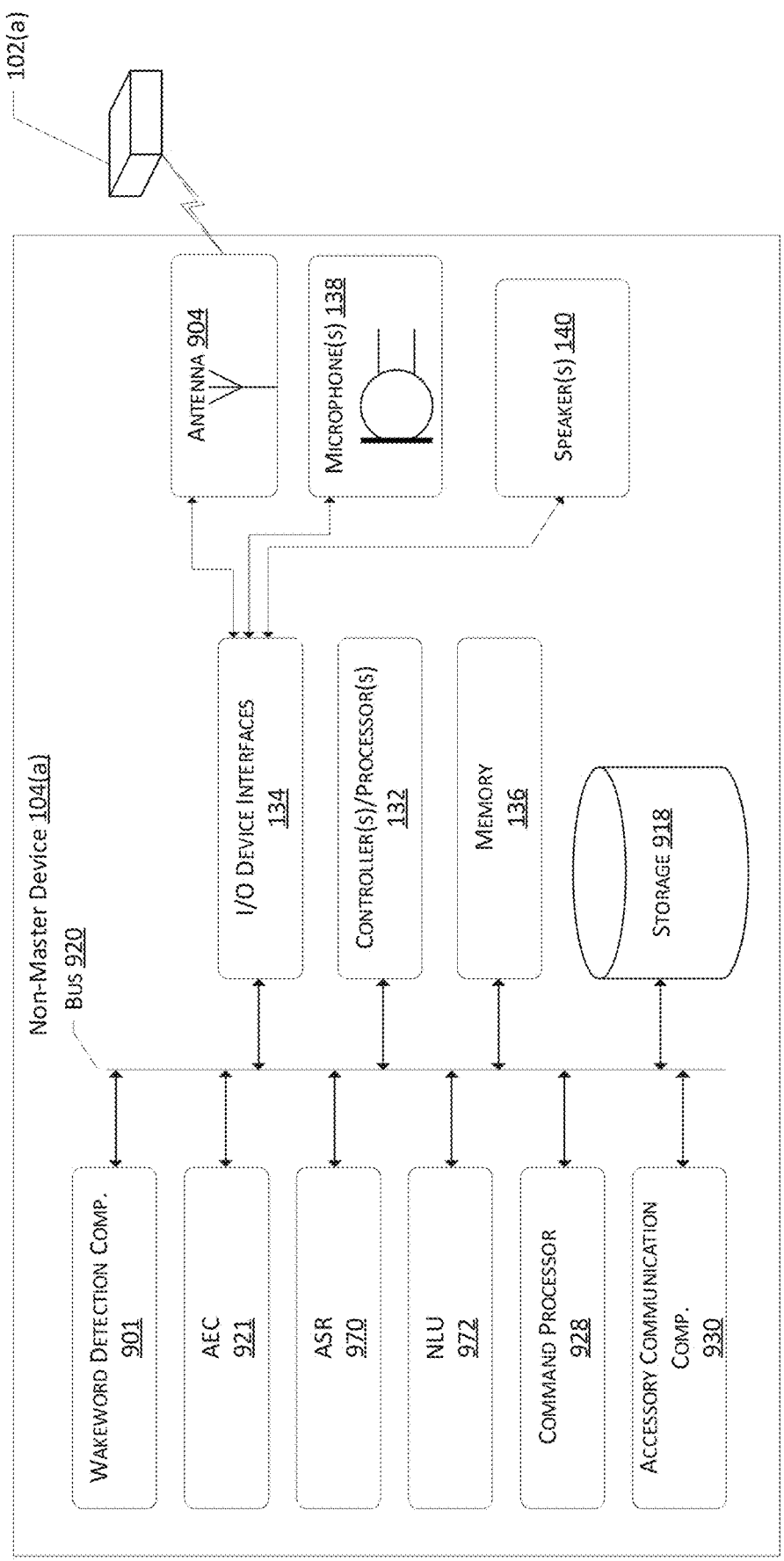
FIG. 9 illustrates a conceptual diagram of example components of a non-master device involved in time synchronization.

FIG. 9 illustrates a conceptual diagram of example components of a non-master device involved in time synchronization. The non-master device 104(*a*) may be implemented as a standalone device 104(*a*) that is relatively simple in terms of functional capabilities with limited input/output components, memory, and processing capabilities. For instance, the non-master device 104(*a*) may not have a keyboard, keypad, or other form of mechanical input. The device 104(*a*) may also lack a display (other than simple lights, for instance) and a touch screen to facilitate visual presentation and user touch input. Instead, the device 104(*a*) may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 104(*a*). Nonetheless, the primary, and potentially only mode, of user interaction with the device 104(*a*) is through voice input and audible output. In some instances, the device 104(*a*) may simply comprise a microphone 138, a power source, and functionality for sending generated audio data via one or more antennas 904 to another device.

The non-master device 104(*a*) may also be implemented as a more sophisticated computing device, such as a computing device similar to, or the same as, a smart phone or personal digital assistant. The device 104(*a*) may include a display with a touch interface and various buttons for providing input as well as additional functionality such as the ability to send and receive communications. Alternative implementations of the device 104(*a*) may also include configurations as a personal computer. The personal computer may include a keyboard, a mouse, a display, and other hardware or functionality that is found on a desktop, notebook, netbook, or other personal computing devices. In examples, the non-master device 104(*a*) may include an automobile, such as a car. In other examples, the non-master device 104(*a*) may include a pin on a user's clothes or a phone on a user's person. In examples, the non-master device 104(*a*) and may not include speaker(s) and may utilize speaker(s) of an external or peripheral device to output audio via the speaker(s) of the external/peripheral device. In this example, the non-master device 104(*a*) might represent a set-top box (STB), and the device 104(*a*) may utilize speaker(s) of another device such as a television that is connected to the STB for output of audio via the external speakers. In other examples, the non-master device 104(*a*) may not include the microphone(s) 138, and instead, the non-master device 104(*a*) can utilize microphone(s) of an external or peripheral device to capture audio and/or generate audio data. In this example, the non-master device 104(*a*) may utilize microphone(s) of a headset that is coupled (wired or wirelessly) to the non-master device 104(*a*). These types of devices are provided by way of example and are not intended to be limiting, as the techniques described in this disclosure may be used in essentially any device that has an ability to recognize speech input or other types of natural language input.

The non-master device 104(*a*) of FIG. 9 may include one or more controllers/processors 132, that may include a central processing unit (CPU) for processing data and computer-readable instructions, and memory 136 for storing data and instructions of the device 104(*a*). The non-master device 104(*a*) may also be connected to removable or external non-volatile memory and/or storage, such as a removable memory card, memory key drive, networked storage, etc., through input/output device interfaces 134.

Computer instructions for operating the non-master device 104(*a*) and its various components may be executed by the device's controller(s)/processor(s) 132, using the memory 136 as temporary "working" storage at runtime. A device's computer instructions may be stored in a non-transitory manner in non-volatile memory 136, storage 918, or an external device(s). Alternatively, some or all of the executable instructions may be embedded in hardware or firmware on the device 104(*a*) in addition to or instead of software.

The non-master device 104(*a*) may include input/output device interfaces 134. A variety of components may be connected through the input/output device interfaces 134. Additionally, the non-master device 104(*a*) may include an address/data bus 920 for conveying data among components of the respective device. Each component within a device 104(*a*) may also be directly connected to other components in addition to, or instead of, being connected to other components across the bus 920.

The device 104(*a*) may include a display, which may comprise a touch interface 1508. Any suitable display technology, such as liquid crystal display (LCD), organic light emitting diode (OLED), electrophoretic, and so on, may be utilized for the displays. Furthermore, the processor(s) 132 may comprise graphics processors for driving animation and video output on the associated display, or the device 104(a) may be "headless" and may primarily rely on spoken commands for input. As a way of indicating to a user that a connection between another device has been opened, the device 104(a) may be configured with one or more visual indicators, such as the light elements(s), which may be in the form of LED(s) or similar components (not illustrated), that may change color, flash, or otherwise provide visible light output, such as for a notification indicator on the device 104(a). The input/output device interfaces 134 that connect to a variety of components. This wired or a wireless audio and/or video port may allow for input/output of audio/video to/from the device 104(a). The device 104(a) may also include an audio capture component. The audio capture component may be, for example, a microphone 138 or array of microphones, a wired headset or a wireless headset, etc. The microphone 138 may be configured to capture audio. If an array of microphones is included, approximate distance to a sound's point of origin may be determined using acoustic localization based on time and amplitude differences between sounds captured by different microphones of the array. The device 104(a) (using microphone 138, wakeword detection component 901, ASR component 970, etc.) may be configured to generate audio data corresponding to captured audio. The device 104(a) (using input/output device interfaces 134, antenna 904, etc.) may also be configured to transmit the audio data to the remote system 106 for further processing or to process the data using internal components such as a wakeword detection component 901.

Via the antenna(s) 904, the input/output device interface 134 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 104(a) via wired connection to an external alternating current (AC) outlet, and/or via onboard power sources, such as batteries, solar panels, etc.

Through the network(s), the speech-processing system may be distributed across a networked environment. Accordingly, the device 104(a) and/or the remote system 108 may include an ASR component 970. The ASR component 970 of device 104(a) may be of limited or extended capabilities. The ASR component 970 may include language models stored in ASR model storage component, and an ASR component 970 that performs automatic speech recognition. If limited speech recognition is included, the ASR component 970 may be configured to identify a limited number of words, such as keywords detected by the device, whereas extended speech recognition may be configured to recognize a much larger range of words.

The device 104(a) and/or the remote system 106 may include a limited or extended NLU component 972. The NLU component 972 of device 104(a) may be of limited or extended capabilities. The NLU component 972 may comprise a name entity recognition module, an intent classification module and/or other components. The NLU component 972 may also include a stored knowledge base and/or entity library, or those storages may be separately located.

In examples, AEC may also be performed by the non-master device 104(a). In these examples, the operations may include causing the AEC component 921 to be enabled or otherwise turned on, or the operations may include causing the AEC component 921 to transition from a first mode to a second mode representing a higher sensitivity to audio data generated by the microphone 138. The AEC component 921 may utilize the audio data generated by the microphone 138 to determine if an audio fingerprint of the audio data, or portion thereof, corresponds to a reference audio fingerprint associated with the predefined event.

The device 104(a) and/or the remote system 106 may also include a command processor 928 that is configured to execute commands/functions associated with a spoken command as described herein. The device 104(a) may include a wakeword detection component 901, which may be a separate component or may be included in an ASR component 970. The wakeword detection component 901 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 104(a) may be configured collectively to identify a set of the directional audio signals in which the wake expression is detected or in which the wake expression is likely to have occurred.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A networking device, comprising:
an antenna configured to wirelessly communicate with a computing device;
a wireless network interface controller;
a router component;
one or more processors; and
non-transitory computer-readable media storing computer-executable instructions that, when executed by the one or more processors, cause the one or more processors to perform operations comprising:
selecting the networking device having the wireless network interface controller as a time-master device configured to serve as a time-keeping reference for time synchronization between the networking device and computing devices, wherein selecting the networking device as the time-master device causes the networking device to be utilized as a wireless access point and the time-master device;
receiving audio data from a remote system;

sending a first instance of the audio data to a first computing device of the computing devices configured to output audio corresponding to the audio data;

sending, to a second computing device of the computing devices configured to output the audio, a second instance of the audio data in a time-synchronous manner with sending the first instance of the audio data to the first computing device; and receiving, as the wireless access point utilizing the router component and while sending the first instance of the audio data and sending the second instance of the audio data, network data other than the audio data from a third computing device of the computing devices, the network data representing input received utilizing a web browser.

2. The networking device of claim 1, wherein the networking device comprises a first networking device, and the operations further comprise:

determining first data indicating a first device type of the first computing device, the first device type indicating that the first computing device is configured to output audio;

receiving second data indicating that a second networking device is in direct communication with a fourth computing device associated with a second device type, the second device type indicating absence of audio-output ability by the fourth computing device; and wherein selecting the first networking device as the time-master device is in response to the second data.

3. The networking device of claim 1, wherein the networking device comprises a first networking device, and the operations further comprise:

determining first data indicating a first number of the computing devices in direct communication with the first networking device;

receiving second data indicating a second number of the computing devices in direct communication with a second networking device, the second number of the computing devices being fewer than the first number of the computing devices; and wherein selecting the first networking device as the time-master device is in response to the second data.

4. The networking device of claim 1, wherein the networking device comprises a first networking device, and the operations further comprise:

receiving first data indicating that a number of the computing devices in direct communication with a second networking device has increased from a first number of the computing devices to a second number of the computing devices;

determining that the second number of the computing devices is greater than a third number of the computing devices in direct communication with the first networking device; and in response to determining that the second number of the computing devices is greater than the third number of the computing devices, selecting the second networking device as the time-master device instead of the first networking device.

5. A device, comprising:

a wireless network interface controller;

a router component;

one or more processors; and non-transitory computer-readable media storing computer-executable instructions that, when executed by the one or more processors, cause the one or more processors to perform operations comprising:

causing the device having the wireless network interface controller to serve as a time-keeping reference for time synchronization between the device and computing devices;

causing the device to serve as a wireless access point while serving as the time-keeping reference;

receiving first content data from a remote system;

sending a first portion of the first content data to a first computing device of the computing devices;

sending, to a second computing device of the computing devices, a second portion of the first content data in a time-synchronous manner with sending the first portion of the first content data to the first computing device; and receiving, as the wireless access point utilizing the router component and while sending the first portion of the first content data and sending the second portion of the first content data, network data other than the first content from a third computing device of the computing devices, the network data requested from the third computing device separately from the first content data.

6. The device of claim 5, wherein the device comprises a first networking device, and the operations further comprise:

determining first data indicating a first device type of the first computing device, the first device type indicating that the first computing device is configured to output audio;

receiving second data indicating that a second networking device is in direct communication with a fourth computing device associated with a second device type, the second device type indicating absence of audio-output ability by the fourth computing device; and wherein causing the first networking device to serve as the time-keeping reference comprises causing the first networking device to serve as the time-keeping reference based at least in part on the second data.

7. The device of claim 5, wherein the device comprises a first networking device, and the operations further comprise:

determining first data indicating a first number of the computing devices in direct communication with the first networking device;

receiving second data indicating a second number of the computing devices in direct communication with a second networking device, the second number of the computing devices being fewer than the first number of the computing devices; and wherein causing the first networking device to serve as the time-keeping reference comprises causing the first networking device to serve as the time-keeping reference based at least in part on the second data.

8. The device of claim 5, wherein the device comprises a first networking device, and the operations further comprise:

receiving first data indicating that a number of the computing devices in direct communication with a second networking device has increased from a first number of the computing devices to a second number of the computing devices;

determining that the second number of the computing devices is greater than a third number of the computing devices in direct communication with the first networking device; and based at least in part on determining that the second number of the computing devices is greater than the third number of the computing devices, selecting the second networking device to serve as the time-keeping reference.

9. The device of claim 5, wherein the device comprises a first networking device, and the operations further comprise:
   determining first data indicating a first number of communications between the first networking device and the first computing device within a period of time;
   receiving second data indicating a second number of communications between a second networking device and a fourth computing device within the period of time;
   determining that the first number is more than the second number; and
   wherein causing the first networking device to serve as the time-keeping reference comprises causing the first networking device to serve as the time-keeping reference based at least in part on determining that the first number is more than the second number.

10. The device of claim 5, wherein the device comprises a first networking device, and the operations further comprise:
   receiving first data indicating first wireless communication abilities of the first computing device;
   receiving second data indicating second wireless communication abilities of a fourth computing device in wireless communication with a second networking device;
   determining that the first wireless communication abilities are less favorable than the second wireless communication abilities; and
   wherein causing the first networking device to serve as the time-keeping reference comprises causing the first networking device to serve as the time-keeping reference based at least in part on the first wireless communication abilities being less favorable than the second wireless communication abilities.

11. The device of claim 5, wherein the device comprises a first networking device, and the operations further comprise:
   determining that a wired connection between the first networking device and a modem is established;
   receiving first data indicating an absence of the wired connection between a second networking device and the modem; and
   wherein causing the first networking device to serve as the time-keeping reference comprises causing the first networking device to serve as the time-keeping reference based at least in part on the wired connection being established between the first networking device and the modem and the absence of the wired connection between the second networking device and the modem.

12. The device of claim 5, wherein the first portion of the first content data corresponds to a first instance of audio data, the second portion of the first content data corresponds to a second instance of the audio data, and the operations further comprise sending a third portion of the first content data corresponding to image data to a fourth computing device configured to display images corresponding to the image data, the third portion of the first content data sent in a time-synchronous manner with sending of the first portion of the first content data and the second portion of the first content data such that the images are displayed by the fourth computing device during output of the audio by the first computing device and the second computing device.

13. A method, comprising:
   causing a networking device having a wireless network interface controller to serve as a time-keeping reference for time synchronization between the networking device and computing devices;
   causing the networking device to serve as a wireless access point while serving as the time-keeping reference;
   receiving first content data from a remote system;
   sending, from the networking device, a first portion of the first content data to a first computing device of the computing devices;
   sending, from the networking device and to a second computing device of the computing devices, a second portion of the first content data in a time-synchronous manner with sending the first portion of the first content data to the first computing device; and
   receiving, as the wireless access point utilizing a router component of the networking device and while sending the first portion of the first content data and sending the second portion of the first content data, network data other than the first content from a third computing device of the computing devices, the network data requested from the third computing device separately from the first content data.

14. The method of claim 13, wherein the networking device comprises a first networking device, and the method further comprises:
   determining first data indicating a first device type of the first computing device, the first device type indicating that the first computing device is configured to output audio;
   receiving second data indicating that a second networking device is in direct communication with a fourth computing device associated with a second device type, the second device type indicating absence of audio-output ability by the fourth computing device; and
   wherein causing the first networking device to serve as the time-keeping reference comprises causing the first networking device to serve as the time-keeping reference based at least in part on the second data.

15. The method of claim 13, wherein the networking device comprises a first networking device, and the method further comprises:
   determining first data indicating a first number of the computing devices in direct communication with the first networking device;
   receiving second data indicating a second number of the computing devices in direct communication with a second networking device, the second number of the computing devices being fewer than the first number of the computing devices; and
   wherein causing the first networking device to serve as the time-keeping reference comprises causing the first networking device to serve as the time-keeping reference based at least in part on the second data.

16. The method of claim 13, wherein the networking device comprises a first networking device, and the method further comprises:
   receiving first data indicating that a number of the computing devices in direct communication with a second networking device has increased from a first number of the computing devices to a second number of the computing devices;
   determining that the second number of the computing devices is greater than a third number of the computing devices in direct communication with the first networking device; and
   based at least in part on determining that the second number of the computing devices is greater than the third number of the computing device, selecting the second networking device to serve as the time-keeping reference.

17. The method of claim 13, wherein the networking device comprises a first networking device, and the method further comprises:
  determining first data indicating a first number of communications between the first networking device and the first computing device within a period of time;
  receiving second data indicating a second number of communications between a second networking device and a fourth computing device within the period of time;
  determining that the first number is more frequent than the second number; and
  wherein causing the first networking device to serve as the time-keeping reference comprises causing the first networking device to serve as the time-keeping reference based at least in part on determining that the first number is more than the second number.

18. The method of claim 13, wherein the networking device comprises a first networking device, and the method further comprises:
  receiving first data indicating first wireless communication abilities of the first computing device;
  receiving second data indicating second wireless communication abilities of a fourth computing device in wireless communication with a second networking device;
  determining that the first wireless communication abilities are less favorable than the second wireless communication abilities; and
  wherein causing the first networking device to serve as the time-keeping reference comprises causing the first networking device to serve as the time-keeping reference based at least in part on the first wireless communication abilities being less favorable than the second wireless communication abilities.

19. The method of claim 13, wherein the networking device comprises a first networking device, and the method further comprises:
  determining that a wired connection between the first networking device and a modem is established;
  receiving second data indicating an absence of the wired connection between a second networking device and the modem; and
  wherein causing the first networking device to serve as the time-keeping reference comprises causing the first networking device to serve as the time-keeping reference based at least in part on the wired connection being established between the first networking device and the modem and the absence of the wired connection between the second networking device and the modem.

20. The method of claim 13, wherein the first portion of the first content data corresponds to a first instance of audio data, the second portion of the first content data corresponds to a second instance of the audio data, and the operations further comprise sending a third portion of the first content data corresponding to image data to a fourth computing device configured to display images corresponding to the image data, the third portion of the first content data sent in a time-synchronous manner with sending of the first portion of the first content data and the second portion of the first content data such that the images are displayed by the fourth computing device during output of the audio by the first computing device and the second computing device.

* * * * *